(12) United States Patent
Alhooshani et al.

(10) Patent No.: US 11,629,235 B2
(45) Date of Patent: Apr. 18, 2023

(54) UREA-FUNCTIONALIZED SOL-GEL

(71) Applicant: King Fahd University of Petroleum and Minerals, Dhahran (SA)

(72) Inventors: Khalid R. Alhooshani, Dhahran (SA); Shehzada Muhammad Sajid Jilani, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 304 days.

(21) Appl. No.: 16/239,615

(22) Filed: Jan. 4, 2019

(65) Prior Publication Data
US 2020/0216620 A1 Jul. 9, 2020

(51) Int. Cl.
*C08J 3/075* (2006.01)
*B01J 13/00* (2006.01)
(Continued)

(52) U.S. Cl.
CPC .......... *C08J 3/075* (2013.01); *B01J 13/0021* (2013.01); *B01J 13/0039* (2013.01);
(Continued)

(58) Field of Classification Search
None
See application file for complete search history.

(56) References Cited

U.S. PATENT DOCUMENTS 4,863,992 A * 9/1989 Wengrovius ........... C08G 77/08
524/789
6,331,330 B1 * 12/2001 Choy .................. C23C 18/1291
427/598
(Continued)

FOREIGN PATENT DOCUMENTS

CN 107091899 A 8/2017

OTHER PUBLICATIONS

Jillani, et al. ; Urea functionalized surface-bonded sol-gel coating for on-line hyphenation of capillary microextraction with high-performance liquid chromatography ; Journal of Chromatography A, vol. 1543 ; pp. 14-22 ; Mar. 30, 2018 ; Abstract Only ; 2 Pages.
(Continued)

*Primary Examiner* — Tae H Yoon
(74) *Attorney, Agent, or Firm* — Oblon, McClelland, Maier & Neustadt, L.L.P.

(57) ABSTRACT

Urea and amine comprising sol-gel hybrid coatings have been developed for numerous applications, including capillary microextraction-high performance liquid chromatographic analysis from aqueous samples. A fused silica capillary may be coated from the inside with surface bonded coating material and may be created by in-situ sol-gel reaction(s). Urea-functionalized coatings can be immobilized on the inner surface of a capillary by condensing silanol groups of capillary and sol-solution. Urea functionalized, sol-gel coated capillaries may be installed, e.g., in HPLC manual injection ports, and optionally pre-concentrated analytes including phenols, ketones, aldehydes, and/or polyaromatic hydrocarbons, from highly polar to non-polar, maybe analyzed by online extraction and high-performance liquid chromatographic. Such coatings may achieve sensitivities with lower detection limits (S/N=3) of 0.10 ng/mL to 14.29 ng/mL, with reproducibilities of <12.0% RSD (n=3), or <10.0% RSD (n=3) by exchanging the capillary of the same size.

17 Claims, 20 Drawing Sheets

(51) Int. Cl.
- C03C 17/30 (2006.01)
- C03C 17/32 (2006.01)
- C09D 183/08 (2006.01)
- C03C 17/00 (2006.01)

(52) U.S. Cl.
CPC ............ *C03C 17/004* (2013.01); *C03C 17/30* (2013.01); *C03C 17/32* (2013.01); *C09D 183/08* (2013.01); *C08J 2483/08* (2013.01)

(56) References Cited

U.S. PATENT DOCUMENTS 7,622,191 B2 11/2009 Malik et al.
2007/0095736 A1 5/2007 Malik et al.

OTHER PUBLICATIONS

Segro, et al. ; Solvent-resistant sol-gel polydimethyldiphenylsiloxane coating for on-line hyphenation of capillary microextraction with highperformance liquid chromatography ; Journal of Chromatography A, vol. 1205, Issues 1-2 ; pp. 26-35 ; Sep. 26, 2008; Abstract Only ; 2 Pages.

Vuk, et al. ; Structural studies of sol-gel urea/polydimethylsiloxane barrier coatings and improvement of their corrosion inhibition by addition of various alkoxysilanes ; Progress in Organic Coatings, vol. 63, Issue 1 ; pp. 123-132 ; Jul. 2008 ; Abstract Only ; 2 Pages.

Vince, et al. ; Structural and Water-Repellent Properties of a Urea/Poly(dimethylsiloxane) Sol-Gel Hybrid and Its Bonding to Cotton Fabric ; ACSPublications, LANGMUIR ; Abstract Only ; 1 Page, 2006.

Fir, et al. ; Functionalisation of Cotton with Hydrophobic Urea/Polydimethylsiloxane Sol-Gel Hybrid ; Acta Chim Slov. 54 ; pp. 144-148; 2007 ; 5 Pages.

Fir, et al. ; Corrosion Studies and Interfacial Bonding of Urea/Poly(dimethylsiloxane) Sol/Gel Hydrophobic Coatings on AA 2024 Aluminum Alloy ; ACSPublications Langmuir ; pp. 5505-5514 ; Abstract Only ; 1 Page ; 2007.

\* cited by examiner

UREA-FUNCTIONALIZED SOL-GEL

STATEMENT REGARDING PRIOR DISCLOSURES BY AN INVENTOR

The inventor(s) publication titled "Urea functionalized surface-bonded sol-gel coating for on-line hyphenation of capillary microextraction with high-performance liquid chromatography" in *J. Chromatography A.* 2018, 15(43), 14-22, published Feb. 19, 2018, is incorporated by reference in its entirety in this application.

BACKGROUND OF THE INVENTION

Field of the Invention

The present application relates to urea-functionalized organic-inorganic hybrid sol-gels, particularly formed by condensing bis(trialkoxysilylalkyl)urea(s) with bis(hydroxyalkyl)amine-terminated poly(di)alkylsiloxane(s), their manufacture and use, e.g., in capillary extraction and hyphenated chromatography.

Description of the Related Art

The separation of chemical substances is relevant in both preparative and analytical chemistry and related fields. Chromatography is a technique used to separate chemical substances and analytical samples. Methods have also been developed to aid chromatographic separations.

Solvent-free sample preparation techniques, such as solid-phase microextraction, have been developed by coating an outer surface of a fused silica capillary with a polymer. Analytes of interest can thereby be pre-concentrated on the small coated external surfaces of the fused silica capillary and subsequently be injected into a gas chromatograph (GC) for analysis. This procedure is commonly known as fiber solid-phase microextraction (SPME), and it has many shortcomings, including low sample capacity, difficulty in immobilizing thick coatings, thermal and/or solvent stability/ robustness, technical complications for hyphenation, i.e., (serial) combination, with liquid chromatographic techniques, and susceptibility of the coated surface to mechanical damage.

In-tube solid phase microextraction or capillary microextraction (CME) was thus developed to facilitate hyphenation of the microextraction technique to liquid chromatographic techniques. Hyphenation is attractive for analyzing thermally labile compounds typically unable to be analyzed using gas chromatographic techniques. A major disadvantage of using fiber SPME technique is potential mechanical damage to the coated surface during analysis. In the case of CME, mechanical damage can be avoided because the wall-coated GC capillary columns contain pre-concentrated analytes inside the capillary column which can be desorbed into a mobile phase for HPLC analysis. Instead of being chemically bonded, the wall coating inside the capillary is an unbound thin layer. The unbound solid phase poses some disadvantages for using SPME or CME in HPLC analysis, including limited sorption, poor solvent stability, and thermal and pH instabilities. The use of varied mobile phases in HPLC makes its unsuitable to combine with SPME or CME and its thin layer wall coating.

To counteract shortcomings in combining CME with HPLC, sol-gel chemistry has been explored for coating the capillary for solid phase microextraction (SPME). The sol-gel technique can help minimize solvent and thermal effects on the coating. Sol-gel chemistry involves chemically bonding the (siloxane) polymer coating inside the capillary. As a result, various functional groups can be immobilized in the polymeric network for better extraction and improved sensitivity. Various silica and non-silica based coatings have been used in this approach. Apart from developing various new techniques in SPME, CME has its own uniqueness and advantages of being an online hyphenation with HPLC. CME is a simplified procedure with fewer variables to optimize and is more precise than other techniques having multiple parameters for one complete analysis. Several approaches to addressing these problems have been taken.

CN 107091899 A by Yu et al. (Yu) discloses a tetrabromobisphenol A measuring method for environmental water. Yu's method involves: (1) pre-treating a water sample; (2) ageing the sample on a solid-phase microextraction fiber head; (3) soaking the solid-phase microextraction fiber head into the sample to separate and enrich target tetrabromobisphenol A; (4) inserting a SPME sampling needle into an SPME-HPLC interface; (5) performing dynamic desorption and completing separation and detection of chromatography-mass spectrometry. Yu's system, however, uses a conventional polydimethylsiloxane (PDMS) coating and does not describe any modifications of its PDMS, nor alternate materials.

U.S. Pat. No. 7,622,191 to Malik et al. (Malik 191) discloses in situ preparation of a titania-based sol-gel PDMS coating and its immobilization on the inner surface of a fused silica microextraction capillary. Malik 191 uses a sol-gel titania-poly (dimethylsiloxane) ($TiO_2$—PDMS) coating for capillary microextraction (CME) to perform on-line preconcentration and HPLC analysis of trace impurities in aqueous samples. Malik 191 reports strong pH stability and enhanced extraction capability over commercially available GC coatings for its titania-based coatings, with extraction characteristics of a sol-gel titania-PDMS capillary practically unchanged after continuous rinsing with 0.1 M NaOH (pH=13) for 12 hours. However, Malik 191 requires a titanium, zirconium, and/or aluminum, particularly titanium, additive in its sol-gel, and fails to disclose urea-containing sol-gels, much less a sol-gel formed from bis(trimethoxysilylpropyl)-urea (BPU) and [bis(hydroxyethyl)amine]-terminated polydimethylsiloxanes (BHEA).

US 2007/0095736 A1 by Malik et al. (Malik 736) discloses a zirconia-based hybrid organic-inorganic sol-gel coating for optional use as a stationary phase in CME, GC, HPLC, capillary electrophoresis (CE), capillary electrochromatography (CEC) and related analytical techniques. Malik 736 uses sol-gel chemistry to chemically bind a hydroxy-terminated silicone polymer (polydimethyldiphenylsiloxane, PDMDPS) to a sol-gel zirconia network. Malik 736 may fill a fused silica capillary with a sol solution to react the sol-gel within the capillary. A layer of the evolving hybrid organic-inorganic sol-gel polymer chemically bonds to the silanol groups on the inner capillary walls, and unbonded sol solution is expelled from the capillary under helium pressure, leaving behind a chemically bonded sol-gel zirconia-PDMDPS coating on the inner walls of the capillary. Malik 736 reports extracting and pre-concentrating polycyclic aromatic hydrocarbons, ketones, and aldehydes from dilute aqueous samples followed by GC separation of the extracted analytes. However, Malik 736 requires a zirconium alkoxide component in its inorganic network and does not teach urea linkages.

U.S. Pat. No. 4,863,992 to Wengrovius et al. (Wengrovius) discloses polyalkoxysilyl-terminated polydiorganosiloxanes which are relatively stable in viscosity over prolonged storage periods, prepared by endcapping a silanol-terminated polydiorganosiloxane in the presence of a catalytic amount of an acidic amine salt which subsequently decomposes to substantially inert products, preferably an amine salt of formic acid, and in the absence of silicon-nitrogen compounds and enoxysilanes normally used as catalyst quenchers and scavengers. Wengrovius considers its products are useful for the preparation of scavenger-free, room temperature vulcanizable compositions, particularly when combined with certain N-alkoxy-silylalkyl-substituted adhesion promoters, including alkoxysilylalkyl amides, imides, ureas, isocyanurates, and/or alkylene diamines, including N,N'-bis(3-trimethoxy-silylpropyl)urea. Wengrovius does not disclose any hydroxyalkylamine-terminated polysiloxanes, nor condensing its sol-gel onto hydroxyl groups on a surface, such as glass, nor SPME or CME with such compounds.

*J. Chromatography A* 2008, 1205(1-2), 26-35 by Sergo et al. (Sergo) discloses a sol-gel polydimethyldiphenylsiloxane (PDMDPS) coating for CME on-line hyphenated with HPLC. The coating uses methyltrimethoxysilane (MTMS) as the sol-gel precursor and di-hydroxy-terminated PDMDPS as the sol-gel active polymer. The methyl and phenyl groups on the sol-gel active polymer and the methyl groups on the sol-gel precursor are ultimately converted into pendant groups enabling extraction of non-polar analytes. A 40-cm segment of 0.25 mm I.D. fused silica capillary containing the sol-gel PDMDPS coating was installed as an external sampling loop in an HPLC injection port. Sample handling included passing aqueous samples through the capillary and extracting analytes with the sol-gel coating. The extracted analytes were then transferred to the HPLC column using isocratic or gradient elution with an acetonitrile/water mobile phase. Sergo reports excellent extraction for non-polar, e.g., PAHs and aromatics, and moderately polar compounds, e.g., aromatic amines, ketones, and aldehydes. Sergo reports that PDMDPS can be immobilized into a sol-gel network and that the coating is high temperature solvent resistant and suitable for on-line hyphenation of CME with HPLC. However, Sergo does not disclose sol-gels comprising urea-moieties, nor hydroxyalkylamine-terminated siloxanes, nor alkylaminoalkyl-moieties within its sol-gel.

*Prog. Org. Coating.* 2008, 63(1), 123-132 by Vuk et al., *Acta Chim. Slov.* 2007, 54, 144-148 by Fir et al., *Langmuir* 2007, 23(10), 5505-5514 by Fir et al., and *Langmuir*, 2006, 22(15), 6489-6497 by Vince et al., (the Slovenes) disclose sol-gel organic-inorganic hybrid precursors, bis[(ureapropyl)triethoxysilane]bis(propyl)-terminated-polydimethylsiloxane 1000 (PDMSU), as a hydrophobic impregnation for cotton fabrics or as a corrosion barrier coating for AA 2024 aluminium alloy. The PDMSU coatings were prepared in either ethanol (PDMSU/EtOH) or propanol (PDMSU/PrOH). XRD measurements of the Slovenes' xerogels showed the diffraction peak of amorphous silica domains at 21.50 and a broad peak at approximately 12.2°, possibly from polyhedral silsesquioxane structural units. Slovenes' coatings on AA 2024, prepared by heat-treatment at 140° C., had poly(dimethylsiloxane) (PDMS) chain segments projecting from the metal surface, which was more pronounced for the PDMSU/PrOH than for the PDMSU/EtOH coatings. Slovenes reported improved corrosion inhibition of PDMSU/PrOH coatings which were attributed to a denser, more compact sol-gel network and higher hydrophobicity, i.e., lower surface energy determined from the contact angle measurements. Adding various tetraalkoxysilanes and alkyltriethoxysilanes further improved the corrosion inhibition of PDMSU coatings due to more extensive cross-linking. Salt-spray tests showed that tetraethoxysilane and phenyltriethoxysilane were the most effective additives. The Slovenes' sol-gels, however, contain no condensed hydroxyalkylamine-terminated siloxanes, nor alkylaminoalkyl-moieties within the sol-gel network. Instead, these references teach corrosion inhibitors for aluminum and/or cotton, not for pre-concentration or extraction of analytes.

Coatings to date have been useful for a variety of purposes, but a need remains for new materials and coatings, as well as methods to make CTE and/or SPME more versatile.

SUMMARY OF THE INVENTION

Aspects of the invention provide sol-gels, comprising, in reacted form: a sol-gel precursor having a structure (I)

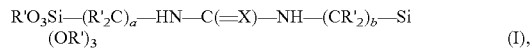

(I), wherein X may be O or S, R' is independently H, methyl, ethyl, propyl, s-propyl, butyl, s-butyl, isobutyl, t-butyl, pentyl, s-pentyl, isoamyl, neopentyl, C6-alkyl, phenyl, or pyridyl, and a and b may be independently in a range of from 1 to 20; and a sol-gel active polymer having a structure (II)

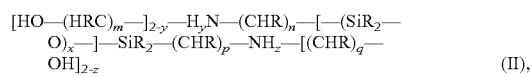

(II), wherein R independently may be H, methyl, ethyl, propyl, s-propyl, butyl, s-butyl, isobutyl, t-butyl, pentyl, s-pentyl, isoamyl, neopentyl, C6-alkyl, phenyl, or pyridyl, y and z may be independently 0 or 1, x may be in a range of from 5 to 2,500, and m, n, p, and q may be independently in a range of from 1 to 20. Such sol-gels may be modified with any permutation of features discussed herein.

In the sol-gel precursor, X may be O, R' may be H, and a and b may be in range of from 2 to 10. Additionally or separately, in the sol-gel precursor, a and b may be identical and in a range of from 2 to 4.

In the sol-gel active polymer, R may be H, y and z may be 0, x may be in a range of from 25 to 500, and m, n, p, and q may be independently in range of from 2 to 10, and/or R may be H, y and z may be 0, x may be in a range of from 30 to 250, m and q may be identical, and m, n, and p may be independently in range of from 2 to 4. Additionally or separately, in the sol-gel active polymer, m and q may be identical to each other, n and p may be identical to each other, and m and n may be independently in range of from 2 to 5.

The sol-gel precursor may be pre-condensed before condensation with the sol-gel active polymer. The pre-condensation may be conducted with a chelating agent comprising acetic acid, citric acid, malonic acid, oxalic acid, trifluoroacetic acid, methanesulfonic acid, toluenesulfonic acid, benzenesulfonic acid, triflic acid, hydrochloric acid, hydrobromic acid, hydroiodic acid, and/or sulfuric acid, in at least 75 wt. %, based on total chelating agent weight. The chelating agent may have a $pK_a$ of less than 1.

The sol-gel may comprise termini comprising hydroxyalkyl groups. Useful sol-gel reagent ratios, based on "equivalents" of the sol-gel polymer to equivalents of the sol-gel precursor, may be in a range of from 1:1 to 1:5. Inventive sol-gels may be formed in a solvent comprising an alcohol in at least 50 wt. % of total solvent weight.

Inventive sol-gels may be those, wherein at least 90% of the sol-gel precursor comprises bis(trimethoxysilylpropyl) urea, bis(triethoxysilylpropyl) urea, bis(trimethoxysilylethyl) urea, bis(triethoxysilylethyl) urea, bis(trimethoxysilylbutyl) urea, bis(triethoxysilylbutyl) urea, bis(trimethoxysilylmethylpropyl) urea, bis(triethoxysilylmethylpropyl) urea, bis(trimethoxysilylpentyl) urea, bis(triethoxysilylpentyl) urea, bis(trimethoxysilylhexyl) urea, bis(triethoxysilylhexyl) urea, bis(trimethoxysilylcyclohexyl) urea, and/or bis (triethoxysilylcyclohexyl) urea, and wherein at least 90% of the sol-gel active polymer comprises [HO—($H_2C$)$_2$]$_2$—N—($CH_2$)$_2$—[—(Si($CH_3$)$_2$—O)$_{30-50}$]—Si($CH_3$)$_2$—($CH_{22}$)$_2$—N[($CH_2$)$_{20}$H]$_2$, [HO—($H_2C$)$_3$]$_2$—N—($CH_2$)$_2$—[—(Si($CH_3$)$_2$—O)$_{30-50}$]—Si($CH_3$)$_2$—($CH_2$)$_2$—N[($CH_2$)$_{30}$H]$_2$, [HO—($H_2C$)$_2$]$_2$—N—($CH_2$)$_3$—[—(Si($CH_3$)$_2$—O)$_{30-50}$]—Si($CH_3$)$_2$—($CH_2$)$_3$—N[($CH_2$)$_{20}$H]$_2$, [HO—($H_2C$)$_3$]$_2$—N—($CH_2$)$_3$—[—(Si($CH_3$)$_2$—O)$_{30-50}$]—Si($CH_3$)$_2$—($CH_2$)$_3$—N[($CH_2$)$_{30}$H]$_2$, [HO—($H_2C$)$_2$]$_2$—N—($CH_2$)$_4$—[—(Si($CH_3$)$_2$—O)$_{30-50}$]—Si($CH_3$)$_2$—($CH_2$)$_4$—N[($CH_2$)$_{20}$H]$_2$, [HO—($H_2C$)$_4$]$_2$—N—($CH_2$)$_2$—[—(Si($CH_3$)$_2$—O)$_{30-50}$]—Si($CH_3$)$_2$—($CH_2$)$_2$—N[($CH_2$)$_{40}$H]$_2$, [HO—($H_2C$)$_3$]$_2$—N—($CH_2$)$_4$—[—(Si($CH_3$)$_2$—O)$_{30-50}$]—Si($CH_3$)$_2$—($CH_2$)$_4$—N[($CH_2$)$_{30}$H]$_2$, [HO—($H_2C$)$_4$]$_2$—N—($CH_2$)$_3$—[—(Si($CH_3$)$_2$—O)$_{30-50}$]—Si($CH_3$)$_2$—($CH_2$)$_3$—N[($CH_2$)$_{40}$H]$_2$, and/or [HO—($H_2C$)$_4$]$_2$—N—($CH_2$)$_4$—[—(Si($CH_3$)$_2$—O)$_{30-50}$]—Si($CH_3$)$_2$—($CH_2$)$_4$—N[($CH_2$)$_{40}$H]$_2$. Inventive sol-gels may be formed by reacting bis(trimethoxysilylpropyl)urea (BPU) and [bis(hydroxyethyl)amine] (BHEA)-terminated poly dimethylsiloxane.

Aspects of the invention may include hybrid organic-inorganic materials, which may comprise a glass having a glass surface comprising silanol moieties; and any inventive sol-gel(s) described herein, terminal hydroxyl groups of the sol-gel active polymer are condensed with the silanol moieties of the glass surface to form a covalent bond having the substructure [glass]-Si—[O—(HRC)m-]2-y-HyN—(CHR)n-[-(SiR2-O)x-] . . . . Such glass surfaces may involve capillaries, comprising inner surface(s) that may be coated with any inventive sol-gel described herein, generally covalently bonded thereto. Such capillaries may be fused silica micro-extraction capillaries.

Aspects of the invention include micro extraction methods, which may comprise: (a) introducing an aqueous sample into a capillary coated and/or covalently bonded with any inventive sol-gel described herein; and optionally (b) passing an eluant comprising acetonitrile and/or deionized water through the capillary. Aspects of the invention include methods for analyzing samples, which methods may comprise: (a) introducing a dissolved sample into a capillary coated and/or covalently bonded with any inventive sol-gel described herein; (b) passing an eluant through the capillary; (c) desorbing an extracted analyte from the capillary onto an analytical column; and (d) eluting the analytical column. Aspects of the invention include methods of enhancing analytical sensitivity, comprising: combining a capillary coated and/or covalently bonded with any inventive sol-gel described herein in series with an HPLC or GC column.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
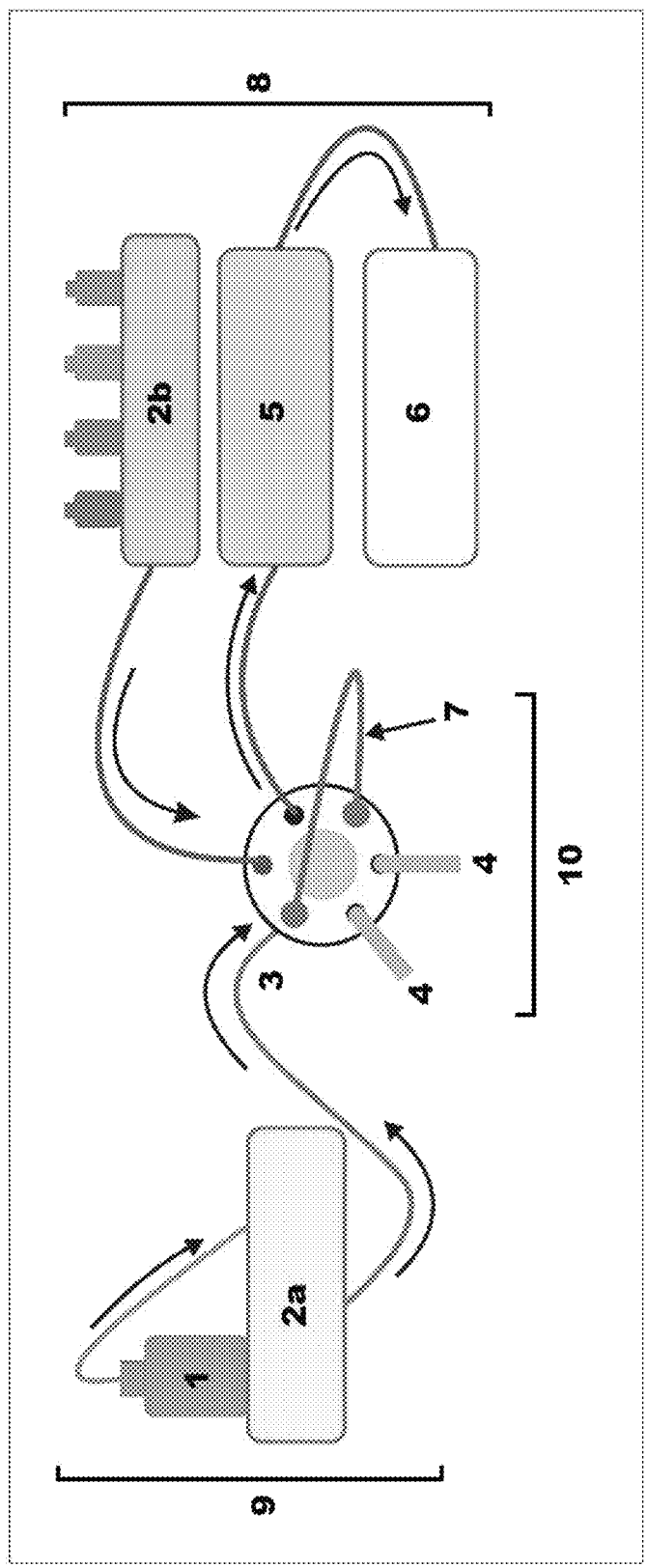
FIG. 1 shows a representation of the setup for CME-HPLC online analysis using the sol-gel within the scope of the invention.

Aspects of the invention include sol-gel syntheses of [bis(hydroxyethyl)amine]terminated polydimethylsiloxane-bis(trimethoxysilylpropyl) urea (BHEA-BPU), e.g., as a surface immobilized coating for capillary microextraction (CME) or solid phase microextraction (SPME). Aspects of the invention use these materials in (improved) extraction sensitivity for compounds having varied polarities, i.e., ranged from non-polar to highly polar. Aspects of the invention use these materials in online CME-HPLC analysis of well-established environmental pollutants and/or detecting for toxicity and persistence in environments, species including PAHs, alcohols, aldehydes, ketones, amides, and phenols.

Aspects of the invention provide sol-gels, comprising, in reacted form: a sol-gel precursor having a structure (I)

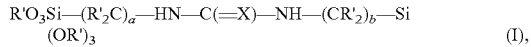

(I), wherein X may be O or S, preferably O (forming a urea moiety), R' is independently H, methyl, ethyl, propyl, s-propyl, butyl, s-butyl, isobutyl, t-butyl, pentyl, s-pentyl, isoamyl, neopentyl, C6-alkyl, phenyl, or pyridyl, while the carbons may be preferably unsubstituted and the alkoxylsilanes may be tailored to be hydrolysable as desired (e.g., with methyl or ethyl groups), and a and b may be independently in a range of from 1 to 20, 1 to 18, 1 to 16, 2 to 14, 2 to 12, 3 to 10, etc.; and a sol-gel active polymer having a structure (II)

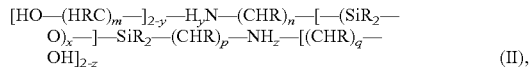

(II), wherein R independently may be H, methyl, ethyl, propyl, s-propyl, butyl, s-butyl, isobutyl, t-butyl, pentyl, s-pentyl, isoamyl, neopentyl, C6-alkyl, phenyl, or pyridyl, y and z may be independently 0 or 1, x may be in a range of from 5 to 2,500, or at least 10, 20, 25, 28, 30, 32, or 34, and m, n, p, and q may be independently in a range of from 1 to 20, or independently any of 2, 3, 4, 5, 6, 7, 8, 9, 10, 11, 12, 13, 14, or 15. The alkylene spacers between the amine and the polysiloxane in the sol-gel active polymers and/or between the alkoxysilane and the urea in the sol-gel precursors could preferably be ethylene, propylene, or butylenes. Inventive sol-gels could advantageously employ 2, 3, 4, or even 5 or more sol-gel active polymers and/or sol-gel precursors. Inventive sol-gel active polymers generally have Mv in a range of from 1000 to 10,000, 2,000 to 7,500, 2,500 to 5,000, or 3,000 to 4,000. For practical synthetic reasons, in the sol-gel active polymer(s) and/or sol-gel precursor(s), a and b, m and q, and/or n and p may be identical to each other. Moreover, certain applications may preferably avoid aryl substituents on the polysiloxane backbone. As a consequence of the reaction of the sol-gel precursor with the sol-gel active polymer, the sol-gel precursor "caps" or terminates the sol-gel active polymer.

The sol-gel precursor may be pre-condensed before condensation with the sol-gel active polymer, preferably using a chelating agent comprising acetic acid, citric acid, malonic acid, oxalic acid, trifluoroacetic acid, methanesulfonic acid, toluenesulfonic acid, benzenesulfonic acid, triflic acid, hydrochloric acid, hydrobromic acid, hydroiodic acid, and/or sulfuric acid, in at least 75, 80, 92.5, 95, 97.5, 98, 99, 99.1, 99.5, or 99.9 wt. %, based on total chelating agent weight. The chelating agent may have a pKa of less than 1, 0.75, 0.5, 0.25, or −0.25.

The sol-gel may comprise termini comprising hydroxyalkyl groups, particularly 2, 3, 4, or more per chain. Useful sol-gel reagent ratios, based on "equivalents" of the sol-gel polymer (insofar as "moles" can be estimated based on $M_v$, $M_w$, and/or $M_n$) to equivalents of the sol-gel precursor, may be in a range of from 1:1 to 1:5, 1:4, 1:3, 1:2, or 1:1.75. Inventive sol-gels may be formed in a solvent comprising an alcohol, particularly methanol, ethanol, n-propanol, and/or isopropanol, in at least 50, 60, 70, 75, 80, 85, 90, 95, 97.5, 98, 99, 99.1, 99.5, or 99.9 wt. % of total solvent weight.

Aspects of the invention may include hybrid organic-inorganic materials, which may comprise a glass having a glass surface comprising silanol moieties; and any inventive sol-gel(s) described herein, terminal hydroxyl groups of the sol-gel active polymer are condensed with the silanol moieties of the glass surface to form a covalent bond having the substructure [glass]-Si—[O—(HRC)$_m$—]$_{2-y}$—H$_y$N—(CHR)$_n$—[—(SiR$_2$—O)$_x$—] . . . . This expression represents the glass matrix as "[glass]" and the glass surface silanol, covalently bonded to a chain in the glass matrix, as "—Si—[O—," whereby the "0" represents a post-condensation shared oxygen between the end of the sol-gel (i.e., sol-gel active polymer(s)). Such covalent bonds between the glass surface and the sol-gel may be 1, 2, 3, or 4 bonds per chain, preferably 2. Such glass surfaces may be (micro) capillaries, comprising inner surface(s) that may be coated with any inventive sol-gel, and may be fused silica microextraction capillaries.

Lengths of the capillaries may be in a range of from 10 cm to 15 m, 15 cm to 10 m, 25 cm to 5 m, 30 cm to 3 m, or the like, depending upon the application, e.g., at least 50 cm, 75 cm, 1 m, 2 m, or more. Exemplary inner capillary diameters may be 100 to 1000, 150 to 750, 200 to 500, or 250 to 400 microns, and/or at least 2, 5, 10, 15, 20, 25, 30, 40, 45, 50, 60, 75, 100, 115, 125, 140, 150, 180, 200, 220, 250, 280, 320, 430, 450, 530, 680, or 700 microns, and/or no more than 800, 725, 700, 690, 630, 550, 500, or 450. Outer diameters of useful capillaries may be at least 50, 90, 100, 150, 180, 200, 230, 250, 280, 300, 315, 350, 380, 400, 425, 450, 475, 500, 550, or 600 micron, and/or no more than 1000, 950, 900, 880, 850, 825, 700, 660, 625, 575, 550, 525, 500, 475, 465, 435, 415, 390, or 365 microns. Capillaries may also have inner diameters in a range of from 2 to 5, 2.1 to 4, 2.2 to 3, or 2.3 to 2.7 mm. Inventive capillaries may be made of or comprise (e.g., at least 75, 80, 85, 90, 91, 92, 92.5, 93, 94, 95, 96, 97, 97.5, 98, 99, 99.1, 99.5, or 99.9 wt. % of a total weight of the capillary material) fused silica, optionally with a polyimide coating. The fused silica may include Type I, Type II, Type III, and/or Type IV.

Capillaries having inventive coatings may be loaded with a pump and/or gas (e.g., He, N$_2$, Ar, etc.) pressure. Typical flow ranges into and/or out of the capillary may be in a range of from 1 to 25, 2 to 20, 3 to 15, or 4 to 10 μL/min. The analytes may be desorbed with a pump, such as a ChromatoProbe pump (Aviv Analytical Ltd.), which lead directly into an HPLC, GC, and/or GC-MS.

Preparations of inventive sol-gels may involve vortexing at 5,000 to 20,000, 7,500 to 17,500, 10,000 to 15,000, 12,500 to 14,000, or 13,000 to 13,500 rpm, or at least 9,000, 11,000, 12,000, or 12,750 rpm, for at least 5, 6, 7, 8, 9, 10, or 15 minutes, and/or no more than 30, 25, 20, 15, 12, 11, or 10 minutes, to give a pre-cured sol-gel, and the sol-gel may be cured at a temperature in a range of from 150 to 350, 175 to 325, 200 to 310, or 250 to 300° C., under an inert environment. As reported by the Slovenes in the background section above, the solvent in which the sol-gel is formed can impact the morphology of the product. Ethanol, methanol, and/or propanol may be useful for many applications. In addition to the sol-gel precursor(s), sol-gel active polymer(s), and chelates, additives may be included in the reaction mixture, such as tri-alkoxyalkylsilane(s)—e.g., trimethoxymethylsilane, triethoxyethylsilane, trimethoxyphenylsilane, etc.—in an amount of up to 20, 15, 10, 5, 2.5, 2, 1, 0.5, 0.1, or 0.001 wt. %, relative to total sol-gel "monomer" weight, to increase cross-linking.

Inventive (micro)extraction methods, may comprise: (a) introducing an aqueous sample into a capillary coated and/or covalently bonded with any inventive sol-gel described herein; and optionally (b) passing an eluant, e.g., comprising acetonitrile, THF, methanol, and/or (deionized) water through the capillary. Inventive coatings may have thickness in a range of from 0.5 to 5, 1 to 4, 1.5 to 3.5, 2 to 3, 2.25 to 2.75, or 2.4 to 2.6 microns, though, in other applications, the coatings may be at least 1.25, 1.67, 2.33, 2.5, 2.67, 3, 3.25, 3.5, 4, 5, 7.5, 10, 15, or 25 microns, and/or no more than 50, 40, 33, 30, 25, 20, 17.5, 16.7, 13.3, 12.5, or 10 microns. The non-hydrogen mass composition of inventive sol-gels may be 30 to 60, 40 to 50, 42.5 to 47.5, or roughly 45 wt. % carbon; 2.5 to 15, 5 to 12.5, 6 to 10, 7 to 9, 7.5 to 8.5, or roughly 8 wt. % nitrogen, 15 to 45, 20 to 40, 25 to 35, 27.5 to 32.5, 29 to 31, or roughly 30 wt. % oxygen, and/or 10 to 30, 12.5 to 27.5, 15 to 25, 16 to 22.5, 16.5 to 20, 17 to 19, or roughly 18 wt. % silicon (roughly meaning ±0.1, 0.25, 0.5, 0.75, 1, or 1.5 wt. %). Non-C/N/O/Si/H elements in inventive sol-gels will generally represent no more than 10, 5, 2.5, 2, 1, 0.5, or 0.1 wt. % in total.

Sensitivities of detection methods/devices may be increased 1.5, 2, 3, 5, 7.5, 10, 12.5, 15, or even 20-fold, by including an inventively coated capillary prior to the hyphenated follow-on analytical method, versus the analytical method alone.

Inventive sol-gels may comprise no more than 10, 5, 4, 3, 2, 1, 0.5, 0.1, 0.001, 0.0001, or 0.00001 wt. %, relative to the total inorganic polymer weight, of titanium, aluminum, and/or zirconium. Inventive sol-gels may comprise no more than 10, 5, 4, 3, 2, 1, 0.5, 0.1, 0.001, 0.0001, or 0.00001 wt. %, relative to the total organic polymer weight, of aromatic moieties, such as phenyl(ene) and/or naphthyl(ene) groups. Inventive sol-gel active polymers may comprise no more than 40, 33, 25, 20, 15, 10, 7.5, 5, 4, 3, 2, 1, or 0.5 wt. %, relative to the total sol-gel active polymer weight, of methyltrimethoxysilane (MTMS) and/or polydimethyldiphenylsiloxane (PDMDPS). Inventive siloxanes may comprise at least 75, 80, 85, 90, 91, 92, 92.5, 93, 94, 95, 96, 97, 97.5, 98, 99, 99.1, 99.5, or 99.9%, based on count of (dialkyl)siloxane monomers, of methyl and/or ethyl substituents, i.e., —(Si(CH$_3$)$_2$—O)$_n$—.

Inventive urea functionalized surface bonded sol-gel coatings useful, for example, in capillary microextraction (CME), optionally in hyphenation with HPLC, can be made by condensing hydroxyalkyl-amino-alkyl-terminated polysiloxanes with urea-containing and/or urea-forming alkoxysilanes. Sol-gel chemistry can provide surface bonded coatings, such as a BHEA-BPU coating, on glass surfaces such as the inner walls of the fused capillaries. Sol-gel chemistry can allow impregnation of desired functional groups like ureas, urethanes, and/or amines into coatings, e.g., for CME. Compared to other coating techniques, sol-gel, potentially a one step process, can simplify surface coating and chemical linking.

Aspects of the invention include urea functionalized sol-gel immobilized surface coatings, particularly on and/or within capillaries. Aspects of the invention include applications of such coatings in online CME-HPLC, CME-GC, CME-LC, CME-MPLC, CME-LC-MS, etc., analysis for polar and/or non-polar analytes. Aspects of the invention include achieving detection limits in a range of from 0.10 to 14.29 ng/mL, including for applications such as wastewater, seawater, and/or pool water analysis and/or quality control.

Typical CME parameters and associated ranges are shown in the table below.

| GC-MS parameters for CME devices | Range (typical) |
| --- | --- |
| Inlet liner | 1-5 mm (2 mm) ultra-inert split/splitless gooseneck |
| Inlet temp | 200-300° C. (260° C.) |
| Carrier gas | Helium, Argon |
| Pressure | 10-20 psi (14.49 psi) |
| Average velocity | 30-60 cm/s (49.76 cm/s) |
| Column | 10-40 m × 100-500 mm × 0.1-0.5 mm (30 m × 250 mm × 0.25 mm) |
| Oven temp | 25-50° C., 1-5 min, 10-50° C./min, 30-60° C., 100-300° C., 1-5 min (30° C., 2.5 min, 40° C./min, 260° C., 2.5 min) |
| Source temp | 100-300° C. (230° C.) |
| Transfer line temp | 100-300° C. (280° C.) |

Example

Experiments were performed on HPLC system (Agilent Technologies, USA) equipped with a quaternary pump (G1311B/C), a DAD (G4212B), an auto-sampler (G1329B), and Chemstation software. An Agilent 1260 infinity isocratic pump (G13103B) was also used as a sample flow system. The column used for separation was Agilent ZORBAX Eclipse XDB C-18 (5 m, 4.6 mm id×250 mm). For the preparation and homogenized mixing of BHEA-BPU sol, a Thermofisher Scientific MaxiMix Vortex mixer was used (model M16715). The precipitates of the sol solution were separated by using Sorvall™ Legend™ micro17 microcentrifuge. X-ray photoelectron spectroscopy (XPS) analysis of the BHEA-BPU coating was conducted on Thermo Scientific ESCALAB 250Xi (PHI 5000 Versa Probe II, ULVAC-PHI Inc., UK) to determine the bonding state and chemical composition of the coating material.

Before analysis, a chunk of sol-gel polymer sample was mounted on carbon tape and subjected to high vacuum to remove impurities or moisture adsorbed on the sample. Thermal stability and decomposition of the BHEA-BPU coating was observed by thermogravimetric analysis (TGA), using a SDT Q600, V20.9 Build 20, thermal analyzer (USA), under a N$_2$ environment from 30 to 600° C. with constant heating rate of 10° C./min. Morphological information on the BHEA-BPU coated in a fused silica capillary was examined by field emission scanning electron microscope (FE-SEM) from TESCAN, LYRA 3 Czech Republic, using secondary electron (SE) and back scattered electron (BSE) mode at an accelerating voltage of 30 kV and equipped with energy dispersive X-ray spectrometer (EDS, Oxford Inc.) detector for elemental analysis.

CHEMICALS/MATERIALS: Fused silica capillary (320 μm I.D. for coating and 250 μm I.D. for sample flow system after deactivating the inner surface) was purchased from Polymicro Technologies USA. N,N'-bis(3-trimethoxysilylpropyl) urea (BPU, 95%, CAS NO: 18418-53-6, MW 384.58, d~1.10 g/mL, C$_{13}$H$_{32}$N$_2$O$_7$Si$_2$) and bis-[(hydroxyethyl)amine]-terminated polydimethylsiloxane (BHEA, CAS NO: 2024596-86-7, 3000 g/mol, 120-160 cSt, d~0.97 g/mL) were purchased from Gelest, USA. Trifluoroacetic acid (TFA, CAS NO: 76-05-1, MW 114.02, d~1.489 g/mL), 4-bromoacetanilide, N-methyl-1-naphthylacetamide, benzanilide, 2,3-dichlorophenol, 2,4-dichlorophenol, 2,4,6-trichlorophenol, 2-benzyl-4-chlorophenol, pentachlorophenol, 4-tert-octylphenol, 2-naphthol, 1-naphthol, diphenylcarbinol, 4-methoxyacetophenone, 4-hydroxybenzophenone, 2-hydroxy-2-phenylacetophenone, propiophenone, benzophenone, benzil, 4-chlorobenzophenone, 4-hydroxy-3-methoxybenzaldehyde, 5-nitrosalisaldehyde, 4-chlorobenzaldehyde, 5-bromobenzaldehyde, biphenyl, fluorene, phenanthrene, and acenaphthene were purchased from Sigma-Aldrich, USA.

PREPARATION OF SOL SOLUTION: The sol solution was prepared by vortexing 100 μL (~97 mg, 0.0323 mmol) of a sol-gel active polymer, BHEA, into 200 μL ethanol in a microcentrifuge tube for 30 seconds. The sol-gel active precursor, BPU (20 μL, ~22 mg, 0.0572 mmol), was added to the reaction mixture with 30 seconds of vortexing. A chelating agent, TFA (8.0 μL, 11.9 mg, 0.104 mmol), and water (5.3 μL) were added to the mixture and mixed very well. Vortexing continued for 2 minutes. The reaction mixture was centrifuged at 13000 rpm for 10 minutes, then the top clear layer was decanted into another microcentrifuge tube in order to coat the inside of the fused silica microextraction capillary.

PREPARATION OF SOL-GEL BHEA-BPU COATED MICROEXTRACTION CAPILLARY: A 3.0 m long fused silica capillary (320 μm i.d.) was rinsed with methanol and dichloromethane and pretreated with 1.0 M NaOH solution, wherein the NaOH solution was kept inside the capillary for 10 hours by closing the both ends of the capillary and flushing later. The capillary was rinsed with 0.1 M HCl to neutralize any NaOH present, and thereafter rinsed with water for cleaning. All rinsing and etching procedures were done under helium pressure using an in-house gas pressure-operated capillary filling device. The capillary was then kept inside the GC oven for drying at 250° C. overnight under helium flow and later taken out of the GC and installed onto the in-house gas pressure-operated capillary filling device for rinsing with methanol and dichloromethane to remove any impurities. Thereafter, the capillary was dried by heat treatment at 300° C. for 2 hours using the GC oven under helium pressure.

A 1.0 m long piece of the pretreated capillary was used for sol-gel coating using a gas pressure operated purging device. The sol solution was purged into the capillary and kept inside the capillary for 15 min to enhance the on-surface reaction of the sol coating. Unreacted sol solution was expelled out of the capillary using helium gas pressure, and the helium flow was continued for 15 additional minutes, to provide a coated capillary. The coated capillary was then subjected to post-treatment as described in *J. Chromatogr. A.* 2004, 1047, 165-174 (incorporated herein by reference in its entirety), using the GC oven to make the sol-gel material more porous and clean.

CAPILLARY MICROEXTRACTION (CME) AND ONLINE CME-HPLC ANALYSIS: An exemplary CME-HPLC analysis is presented in FIG. 1, showing a sample flow system (9), manual injection port (10), and an HPLC system (8). In an exemplary run, the analytical column was pre-equilibrated with the mobile phase and kept ready for manual injection. A 40 cm long sol-gel BHEA-BPU coated capillary was fixed into place on the sample loop of the manual injection port. The injection port was switched to "load" mode and an aqueous sample having the analytes of interest was pre-concentrated in the sol-gel BHEA-BPU coated capillary with a constant flow of 1.0 mL/min using the isocratic pump. Deionized water was flushed through the sol-gel BHEA-BPU coated capillary thereafter to remove the sample matrix in the capillary loop. The injection port was then switched to "inject" mode for the desorption of the extracted analytes from the sol-gel BHEA-BPU coated capillary onto the analytical column. The analytical HPLC column was used to separate the analytes based on the interaction between mobile phase and stationary phase, and the eluant detected with a UV detector.

ENRICHMENT FACTOR: The enrichment factors for all the analytes were calculated, as described in *Anal. Chem.* 2011, 83, 7531-7541 (incorporated herein by reference in its entirety), by dividing the peak area of the extracted analyte by the peak area of standard analyte. The peak area for the analyte from the standard solution was obtained by injecting 20 μL of the standard solution into the HPLC manual port without any extraction.

REAL WORLD SAMPLE ANALYSIS USING BHEA-BPU COATED CAPILLARY: A similar run that was designed to present the capillary to capillary extraction was also used to demonstrate the applicability of a BHEA-BPU coated capillary in real world samples. Members from different organic compound classes were selected as a representative of varied nature and polarity. Real world samples were collected from three different sources: wastewater; sea water; and swimming pool water. The real world samples were filtered using filter paper (pore size 0.45 m) before the online CME-HPLC analysis. To evaluate the recovery from the samples and the accuracy of the runs, peak areas obtained from the analysis of the standard solutions were compared with the peak areas of artificially spiked samples in the real water samples. Spiking was done at 100, 300, and 500 ng/mL, and each run was repeated thrice (n=3).

CREATION OF SOL-GEL COATING, E.G., BASED ON BHEA-BPU: Inventive coatings are generally made by condensing a sol-gel precursor, comprising a urea or thiourea or urethane moiety, with a sol-gel active polymer, comprising amino-alkanol termini. The sol-gel precursor has a general structure as in Formula (I)

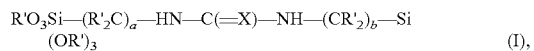

$$R'O_3Si-(R'_2C)_a-HN-C(=X)-NH-(CR'_2)_b-Si(OR')_3 \quad (I),$$

wherein X is O or S (forming urea or thiourea), R is independently H, methyl, ethyl, propyl, s-propyl, butyl, s-butyl, isobutyl, t-butyl, pentyl, s-pentyl, isoamyl, neopentyl, C6-alkyl, phenyl, or pyridyl (though non-aryl substituents may be preferred in certain applications), a and b are independently in a range of from 1 to 20, 2 to 16, 2 to 14, e.g., 1, 2, 3, 4, 5, 6, 7, 8, 9, 10, or more, though a and b are usually identical for practical reasons. Suitable sol-gel precursors include bis(trimethoxysilylpropyl), bis(triethoxysilylpropyl), bis(trimethoxysilylethyl), bis(triethoxysilylethyl), bis(trimethoxysilylbutyl), bis(triethoxysilylbutyl), bis(trimethoxysilylmethylpropyl), bis(triethoxysilylmethylpropyl), bis(trimethoxysilylpentyl), bis(triethoxysilylpentyl), bis(trimethoxysilylhexyl), bis(triethoxysilylhexyl), bis(trimethoxysilylcyclohexyl), bis(triethoxysilylcyclohexyl), etc., urea, thiourea, or mixtures of these. The alkyl spacers between the (thio)urea and silyl groups, which may be interrupted by one or more oxygens (forming ethers), and/or may be substituted, e.g., with 1, 2, 3, or 4 methyl, ethyl, propyl, fluoro, carboxylate, methoxy, ethoxy, and/or hydroxy groups (or be perfluorinated), but need not be. The alkoxyl groups on the silyl termini may be selected to tailor the rate of hydrolysis of the alkoxysilyl group. The sol-gel precursor(s) can be made to undergo a controlled polycondensation to form the colloidal system called sol and this sol further form a 3D structure that is called gel. In the polycondensation reaction shown in FIG. 2B n may be 1, 2 or 3.

The sol-gel precursor(s) may be reacted with at least one sol-gel active polymer, e.g., polydialkylsiloxane, polydiarylsiloxane, polyarylalkylsiloxane, polyhydroalkylsiloxane, polyhydroarylsiloxane, etc., such as polydimethylsiloxane (PDMS), polydiethylsiloxane (PDES), polydipropylsiloxane, polymethylethylsiloxane, polymethylphenylsiloxane, polydiphenylsiloxane (PDPS), or the like, having a general structure as in Formula (II):

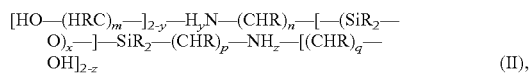

(II), wherein R is independently H, methyl, ethyl, propyl, s-propyl, butyl, s-butyl, isobutyl, t-butyl, pentyl, s-pentyl, isoamyl, neopentyl, C6-alkyl, phenyl, or pyridyl (though non-aryl substituents may be preferred in certain applications); y and z are independently 0 or 1; x is in a range of from 5 to 2,500, 10 to 1,500, 15 to 1,000, 20 to 750, 25 to 500, 30 to 250, or 35 to 100; and m, n, p, and q are independently 2, 3, 4, 5, 6, 7, 8, 9, 10, 12, 14, 16, or more. Exemplary terminal moieties on any of the above described or otherwise known sol-gel active polymers include bis(hydroxyethyl)amine (BHEA), bis(hydroxypropyl)amine, bis(hydroxybutyl)amine, bis(hydroxypentyl)amine, and bis(hydroxyhexyl)amine. Any intervening alkyl spacers between the amine terminus and the polysiloxane may include 1, 2, 3, 4, 5, 6, 7, 8, 9, 10, or more carbons, which may be interrupted by one or more oxygens (forming ethers), and/or may be substituted, e.g., with 1, 2, 3, or 4 methyl, ethyl, propyl, fluoro, carboxylate, methoxy, ethoxy, and/or hydroxy groups (or be perfluorinated).

The sol-gel active polymer(s) can be dissolved in a solvent, for example water, methanol, ethanol, propanol, isopropanol, butanol, THF, dioxane, ethylene glycol, diethyl ether, dischloromethane, chloroform, pyridine, acetone, and/or ethyl acetate, to dissolve the contents in the sol solution. A strong acid, such as trifluoroacetic acid (TFA), can act as a chelating agent for the gelation of the sol-gel active precursor, and hydrolyze the sol-gel active precursor(s). The hydrolyzed reactive species further undergo polycondensation to produce the urea functionalized three-dimensional network.

Hydroxyl portions of BHEA- or alkanol-terminated sol-gel active polymer condense with silanol groups of glass surfaces, such as inner sides of a fused silica capillary, and produce a surface bonded polymer condensed with (or condensable with) a sol-gel active precursor network, such as the BPU network described above, over the surface, i.e., the interior surface of the capillary, wherein the network includes urea functionalized moieties. This surface condensation can be followed by heat treatment to produce cross-linking and porosity. The chelating agent, TFA, controls the gelation process by decelerating the condensation of the BHEA-BPU coating.

Figure 2A:
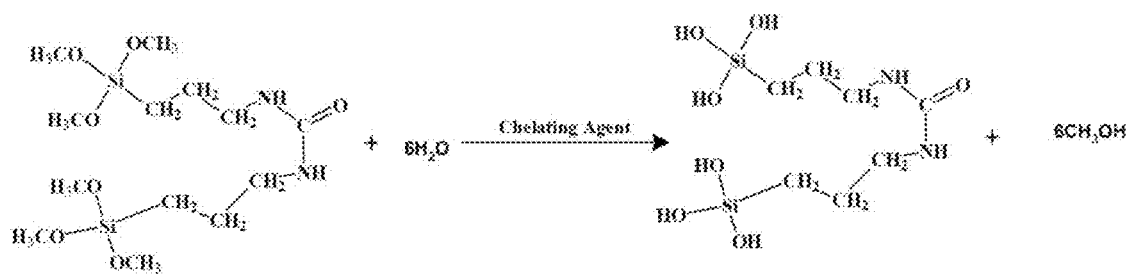
FIG. 2A-C show (A) a reaction scheme representing the hydrolysis of a bis-(trimethoxysilylpropyl) urea (BPU) precursor; (B) a reaction scheme representing the polycondensation of hydrolyzed BPU; and (C) an exemplary final structure representation of a BPU-bis-[(hydroxyethyl)amine] terminated polydimethylsiloxane (BHEA) coating within the scope of the invention.
Figure 2B:
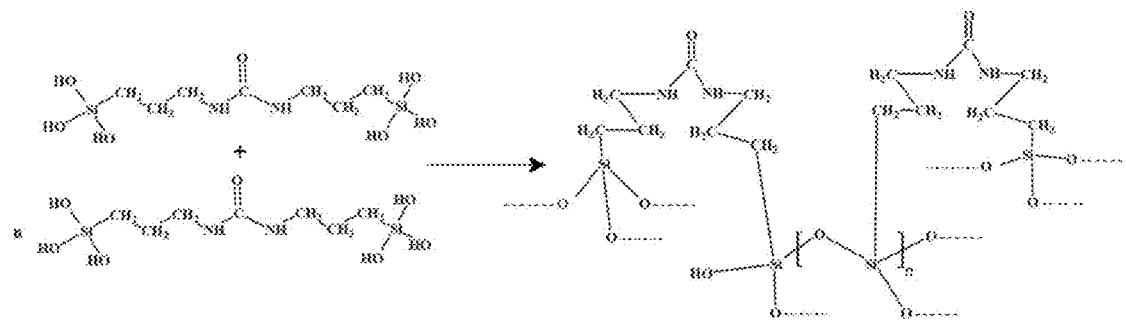
Figure 2C:
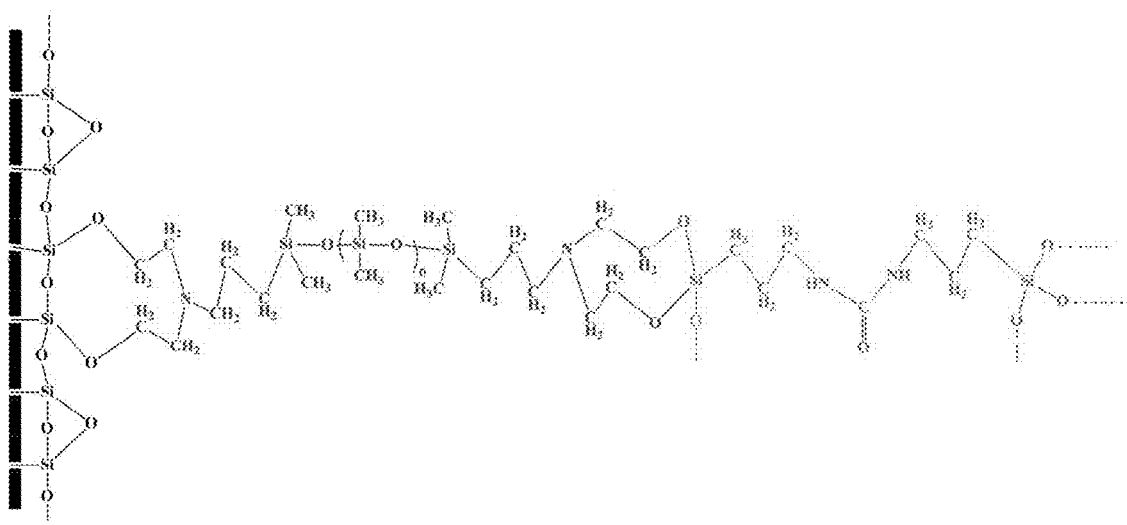
Figure 3A:
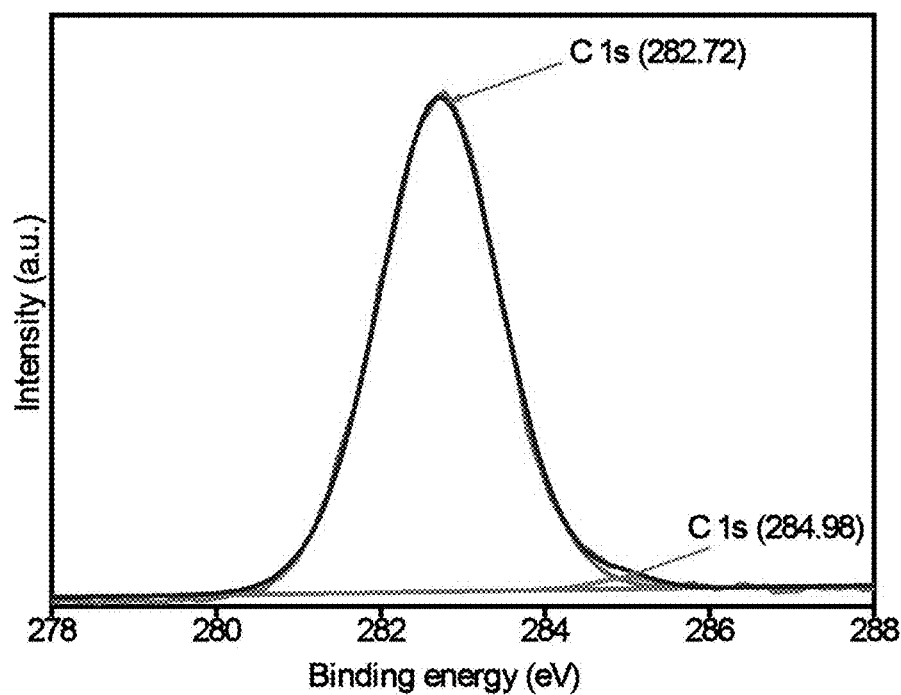
FIG. 3A-D show XPS analyses of a BHEA-BPU polymer synthesized according to the Example before capillary coating in a fused-silica capillary showing different bonding states of C, N, O, and Si at different binding energy (eV) ranges.
Figure 3B:
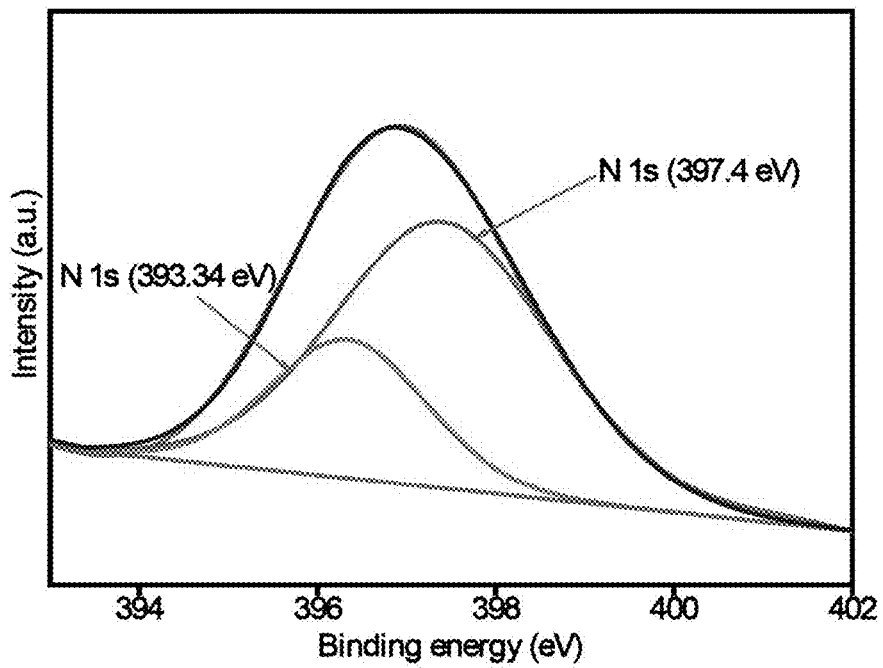
Figure 3C:
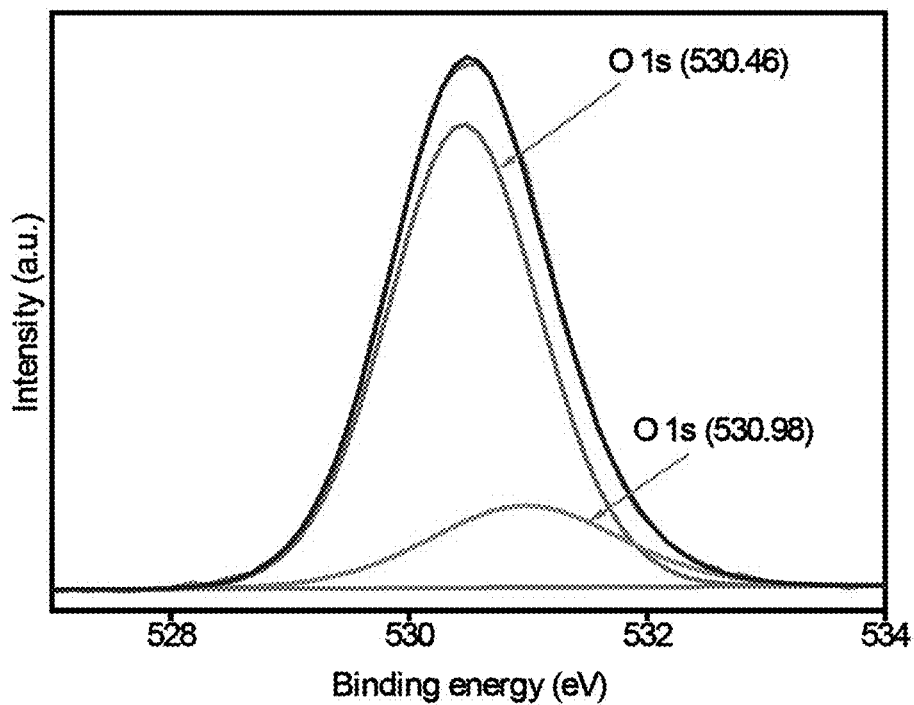
Figure 3D:
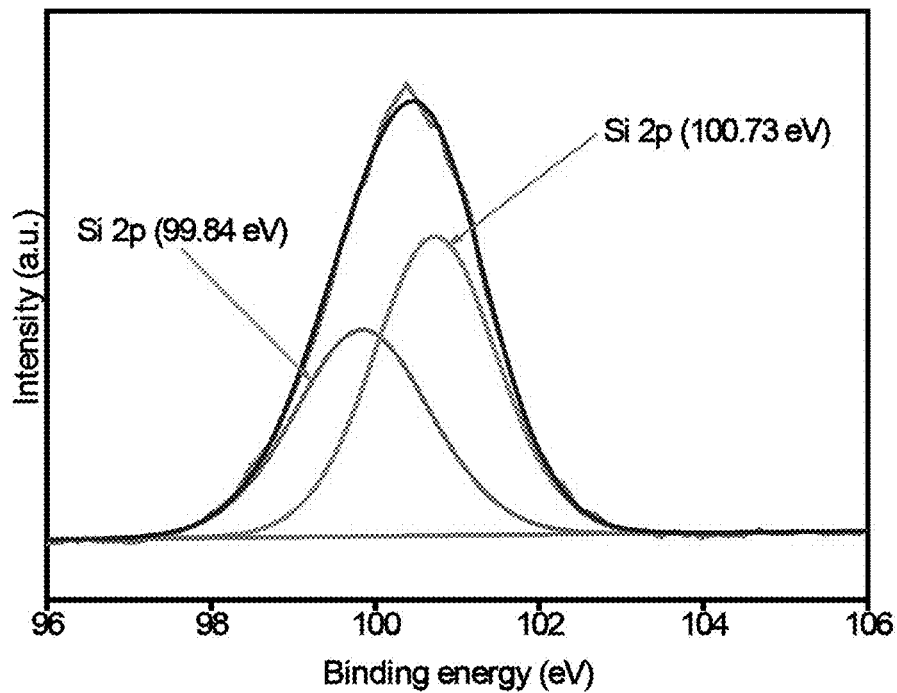

The sol-gel process to create inventive coatings, e.g., on the inner surface of fused silica capillaries, involves: (i) hydrolyzing the sol-gel precursor, such as BPU—bis(trimethoxysilylpropyl) urea; (ii) polycondensation of the sol-gel precursor, e.g., BPU, to form a sol-gel network after the hydrolysis; (iii) chemically reacting (condensing) a sol-gel active polymer, such as BHEA-terminated PDMS, with the (BPU) sol-gel network; and (iv) chemically immobilizing the sol-gel material, to the silanol groups on the inner surface of fused silica capillaries. These steps result in forming a urea-functionalized sol-gel surface bonded coating for microextraction, as illustrated in FIG. 2A to 2C.

Characterization of the exemplary BHEA-BPU sol-gel coating for CME: FIG. 3A to 3D and Table 1, below, provide the results of XPS analysis of the exemplary BHEA-BPU sol-gel synthesized as described above, to gain insight into the structural arrangement of the main components. The observation of polymer's main composition with respect to atomic weight-% is in good agreement with the proposed structure and confirms the successful polymerization reactions for uniform capillary coating applications.

TABLE 1

Bonding states and atomic weight
(%) of polymer composition by XPS

| Name | Peak BE | Atomic % |
|---|---|---|
| C1s | 282.72 | 45.3 |
| C1s | 284.98 | 0.52 |
| N1s | 397.4 | 0.42 |
| N1s | 396.34 | 0.15 |
| O1s | 530.46 | 21.81 |
| O1s | 530.98 | 4.84 |
| Si2p | 99.84 | 11.66 |
| Si2p | 100.73 | 15.3 |

ONLINE CME-HPLC ANALYSIS USING SOL-GEL COATED BHEA-BPU CAPILLARY: The sol-gel BHEA-BPU coated capillary produced as described above demonstrated excellent extraction abilities for various class of compounds, ranging from non-polar to highly polar compounds. The various classes include the polyaromatic hydrocarbons, aldehydes, ketones, alcohols, phenols, and amides, which are analyzed in FIG. 7 to 12. The BHEA-BPU coated capillary was equally suitable for a range in polarities of various analytes. Extraction of non-polar analytes may be attributable to the polydimethylsiloxane (PDMS) moiety in the BHEA sol-gel active polymer, and polar analytes extraction efficiency may be attributable to functional groups like amine and urea in precursor BPU and polymer BHEA respectively. As shown in Table 2, below, the CME-HPLC analysis showed low detection limits ranging between 5.21 and 11.90 ng/mL (S/N=3) and reliable % RSD (less than 10%) where n=3.

TABLE 2

Peak area reproducibility and detection limits for amides, phenols, alcohols, ketones, aldehydes, and PAHs in CME-HPLC$^a$ using a sol-gel BPU-BHEA coated microextraction capillary according to the invention

| Chemical class Analyte name | Peak area reproducibility (n = 3) | | Detection limit | |
|---|---|---|---|---|
| | Mean peak area (mAU) | RSD (%) | (ng mL$^{-3}$) (S/N = 3) | Enrichment factors |
| Amides | | | | |
| 4-bromoacetanilide | 138.4 | 4.6 | 7.25 | 42.4 |
| N-methyl-1-naphthylacetamide | 68.5 | 9.5 | 11.90 | 25.2 |
| Benzanilide | 206.1 | 3.2 | 5.21 | 57.6 |

TABLE 2-continued

Peak area reproducibility and detection limits for amides, phenols, alcohols, ketones, aldehydes, and PAHs in CME-HPLC[a] using a sol-gel BPU-BHEA coated microextraction capillary according to the invention

| Chemical class<br>Analyte name | Peak area reproducibility (n = 3) | | Detection limit | |
|---|---|---|---|---|
| | Mean peak area (mAU) | RSD (%) | (ng mL$^{-3}$) (S/N = 3) | Enrichment factors |
| Phenols | | | | |
| 2,3-dichlorophenol | 26.3 | 3.6 | 12.50 | 24.0 |
| 2,4-dichlorophenol | 54.8 | 2.0 | 9.43 | 31.8 |
| 2,4,6-trichlorophenol | 21.1 | 6.0 | 4.55 | 55.0 |
| 2-benzyl-4-chlorophenol | 30.1 | 1.4 | 1.92 | 36.4 |
| Pentachlorophenol | 48.2 | 1.8 | 6.41 | 39.0 |
| 4-tertoctylphenol | 47.6 | 5.2 | 6.94 | 36.0 |
| Alcohols | | | | |
| 2-naphthol | 77.3 | 4.9 | 1.45 | 172.5 |
| 1-naphthol | 33.5 | 4.9 | 2.38 | 105.0 |
| Diphenylcarbinol | 85.2 | 2.8 | 1.39 | 180.0 |
| Ketones | | | | |
| 4-methoxyacetophenone | 29.4 | 6.7 | 10.75 | 27.9 |
| 4-hydroxybenzophenone | 47.3 | 2.9 | 8.93 | 33.6 |
| 2-Hydroxy-2-phenylacetophenone | 20.9 | 2.6 | 13.66 | 22.0 |
| Propiophenone | 40.2 | 1.6 | 9.62 | 31.2 |
| Benzophenone | 145.4 | 2.1 | 2.46 | 122.2 |
| Benzil | 167.1 | 2.8 | 2.14 | 140.2 |
| 4-chlorobenzophenone | 351.3 | 2.6 | 1.70 | 176.2 |
| Aldehydes | | | | |
| 4-Hydroxy-3-methoxybenzaldehyde | 20.2 | 11.3 | 9.09 | 33.0 |
| 5-Nitrosalisaldehyde | 140.8 | 5.3 | 2.88 | 104.2 |
| 4-chlorobenzaldehyde | 9.3 | 11.8 | 14.29 | 21.0 |
| 5-bromobenzaldehyde | 55.6 | 8.0 | 5.40 | 55.6 |
| Polyaromatic Hydrocarbons | | | | |
| Biphenyl | 167.2 | 1.9 | 0.31 | 193.5 |
| Fluorene | 134.4 | 3.0 | 0.40 | 150.0 |
| Phenanthrene | 717.8 | 2.5 | 0.10 | 240.0 |
| Anthracene | 213.3 | 4.5 | 0.21 | 171.4 |

[a]Extraction conditions: 40 cm × 0.32 mm i.d. sol-gel BPU-BHEA- coated capillary; extraction time: 30 min: HPLC conditions: 25 cm × 4.6 mm i.d. Eclipse XDB C-18 column (5 μm d$_p$). For amides, phenols, alcohols, ketones, and aldehydes:gradient elution from 45:55 (v/v) acetonitrile (ACN):15 mM phosphate buffer 2.5 pH to 70% ACN for 20 minutes and 45:55 (v/v) ACN:15 mM phosphate buffer 2.5 pH till 30 minutes; runtime 30 minutes; 0.8 mL/min flow rate, UV detection at 230 nm (amides, alcohols and aldehydes), 280 nm (phenols), 254 nm (ketones). For PAHs:isocratic elution from 80:20 (v/v) ACN:water for 15 min; 0.8 mL/min flow rate; UV detection at 254 nm.

In addition to the limits of detection (LOD) and reproducibility of various analytes, Table 2 also presents the enrichment factors for all the analytes ranging from 21.0 to 240-fold. Higher enrichment factors lead to lower level of detection limits, hence indicating excellent the extraction ability of the BHEA-BPU coated capillary.

Among other things, inventive sol-gel BHEA-BPU coated capillary may useful for hyphenating capillary microextraction with HPLC, LC, MPLC, and/or GC to achieve lower detection limits. GC may use more sensitive detectors than CME-HPLC UV detectors.

Inventive hybrid sol-gel coatings according to the invention, such as BHEA-BPU, can be directly chemically attached, i.e., covalently bonded, to the inner surface of the capillary, making the coatings resistant to solvent flow and good for pre-concentrating analytes, e.g., from the water samples. Urea functionalized sol-gel surface bonded BHEA-BPU coatings show extraordinary extraction abilities towards a complete range of analyte polarities. Online CME-HPLC analysis using such coatings with a UV detector have shown sub ppb detection limits (0.10 ng/mL to 14.29 ng/mL) for amides, phenols, alcohols, ketones, aldehydes, and PAHs. Such detection limits may be further improved using inventive coated capillaries in CME-GC analysis due to higher detector sensitivities.

Referring now to the drawings, wherein like reference numerals designate identical or corresponding parts throughout the several views.

FIG. 1 shows an exemplary hyphenated analytical system including a sample flow system (9), manual injection port (10), and an HPLC system (8). A sol-gel coated capillary (7), e.g., using a BHEA-BPU sol-gel, may be fixed into place in the sample loop of the manual injection port (10). The injection port (3) can load a sample (1), e.g., as an aqueous solution of analytes of interest, for pre-concentration on the sol-gel coated capillary (7) using an isocratic and/or gradient pump (2a). The extracted analytes from the sample (1) can be desorbed from the sol-gel coated capillary (7) onto an analytical column in the column oven (5). The analytical column separates the analytes based on the interaction between mobile phase and stationary phase, driven by an HPLC gradient pump (2b) or other suitable pump, and the analytes detected, e.g., with a UV detector (6). Waste (4) flows out of the manual injector (10), and waste (4) and/or sample eluant flow out of the HPLC system (8), the detector, and/or the column oven (5), for example, depending upon whether the hyphenated chromatographic run is analytical or preparative.

FIG. 2A to 2C show a hypothetical representation of the hydrolysis (FIG. 2A) and polycondensation (FIG. 2B) of a BPU precursor and the final coating material network immobilized inside the capillary wall (FIG. 2C).

FIG. 3A to 3D show x-ray photoelectron spectroscopy (XPS) analyses of the exemplary BHEA-BPU sol-gel polymer synthesized as described above, to gain insight into the structural arrangement of the main components with the binding energies and atomic mass/weight (%) of C, N, Si, and O components, respectively shown in Table 1 as well. The carbon (C is) signals at 282.7 and 284.9 eV binding energies, represent the main content or backbone of the polymer (45 wt. %) as observed from the monomers. These two C is forms represent the carbon largely bonded with semi-metallic element (282.7 eV) at 98.8% and the carbon in graphitic form (284.9 eV) at 1.13%. The oxidation state of nitrogen revealed two forms of nitrogen at 397.4 and 396.3 eV, corresponding to N is in nitride-form in two different environments. The observed binding energies of 0 is at 530.46 and 530.98 eV correspond to the presence of carbonyls/carbonates (C=O) and Si—O oxygens of the constituents that formed the polymer, respectively. The evidence of Si 2p bonded with carbon and oxygen atoms was found at binding energies of 99.84 and 100.73 eV, respectively.

Figure 4:
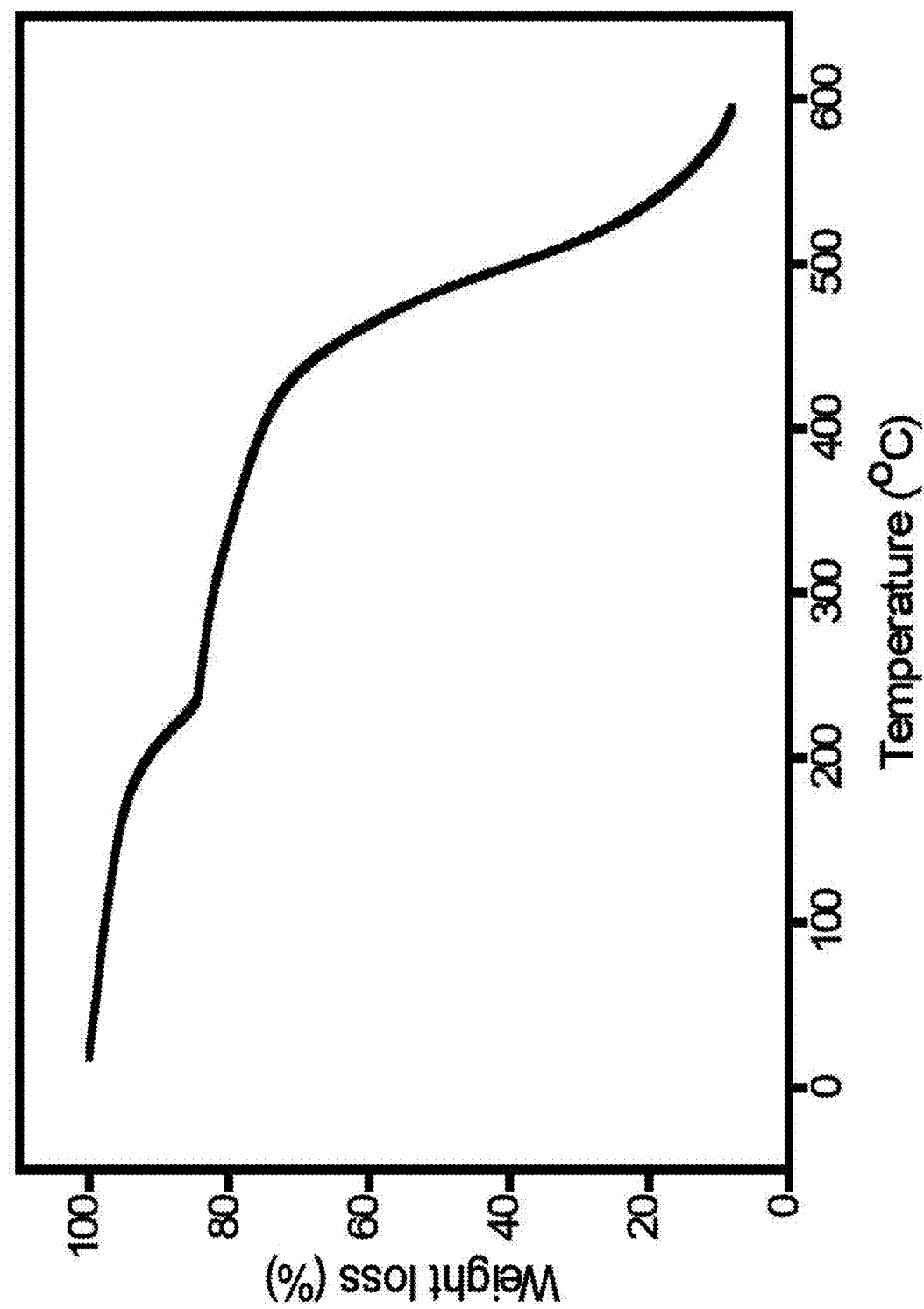
FIG. 4 shows a thermogravimetric analysis (TGA) spectrum of a BHEA-BPU polymer synthesized according to the Example before capillary coating in fused-silica capillary.

FIG. 4 shows a thermogravimetric analysis of the BHEA-BPU sol-gel polymer synthesized as described above. FIG. 4 indicates a gradual loss of weight (approx. 15%) from room temperature (30° C.) to above 250° C. in a first phase transition. This observation could be attributed to the loss of adsorbed water and other impurities associated with the sol-gel prepared polymer. Further, a gradual weight loss estimated to be 15% was observed until 450° C. in a second phase transition, which could be attributed to gradual decomposition of organic material network (backbone) in the polymer. After 450° C., there is an exponential drop in the weight loss of the polymer material up to 600° C. and the estimated weight loss is about 90%. This phase transition indicates the complete decomposition of the polymer and formation of carbon/soot. Therefore, the thermal stability and practical working temperature of as-developed polymer will be within the range of 0 to 300° C. without significant decomposition as shown in FIG. 4.

Figure 5A:
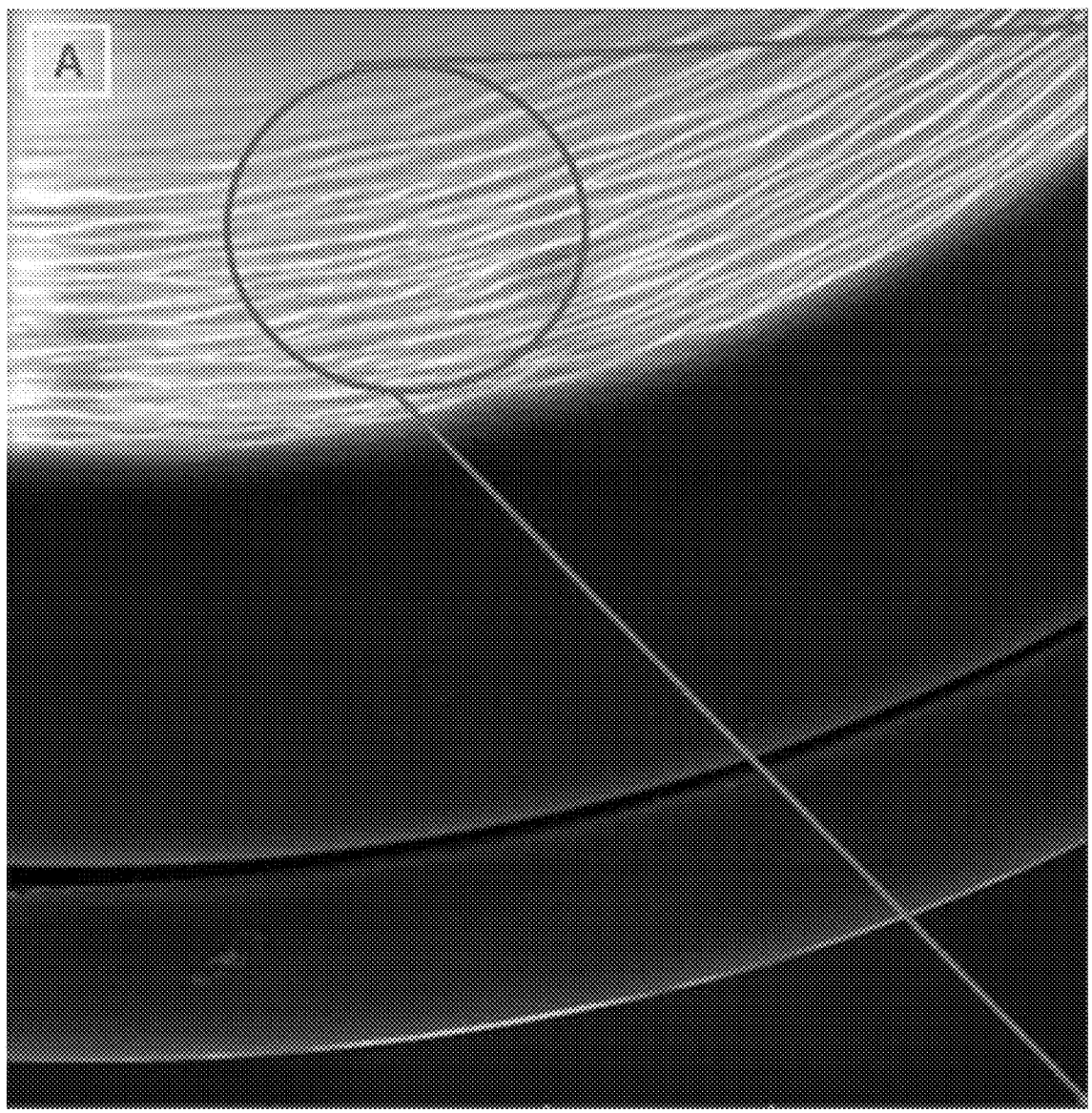
FIG. 5A-C show scanning electron microscopy (SEM) images of a BHEA-BPU coating inside the fused silica capillary at low (A) and high (B) magnifications, as well as (C) the thickness of an exemplary polymer coated in capillary fused-silica.
Figure 5B:
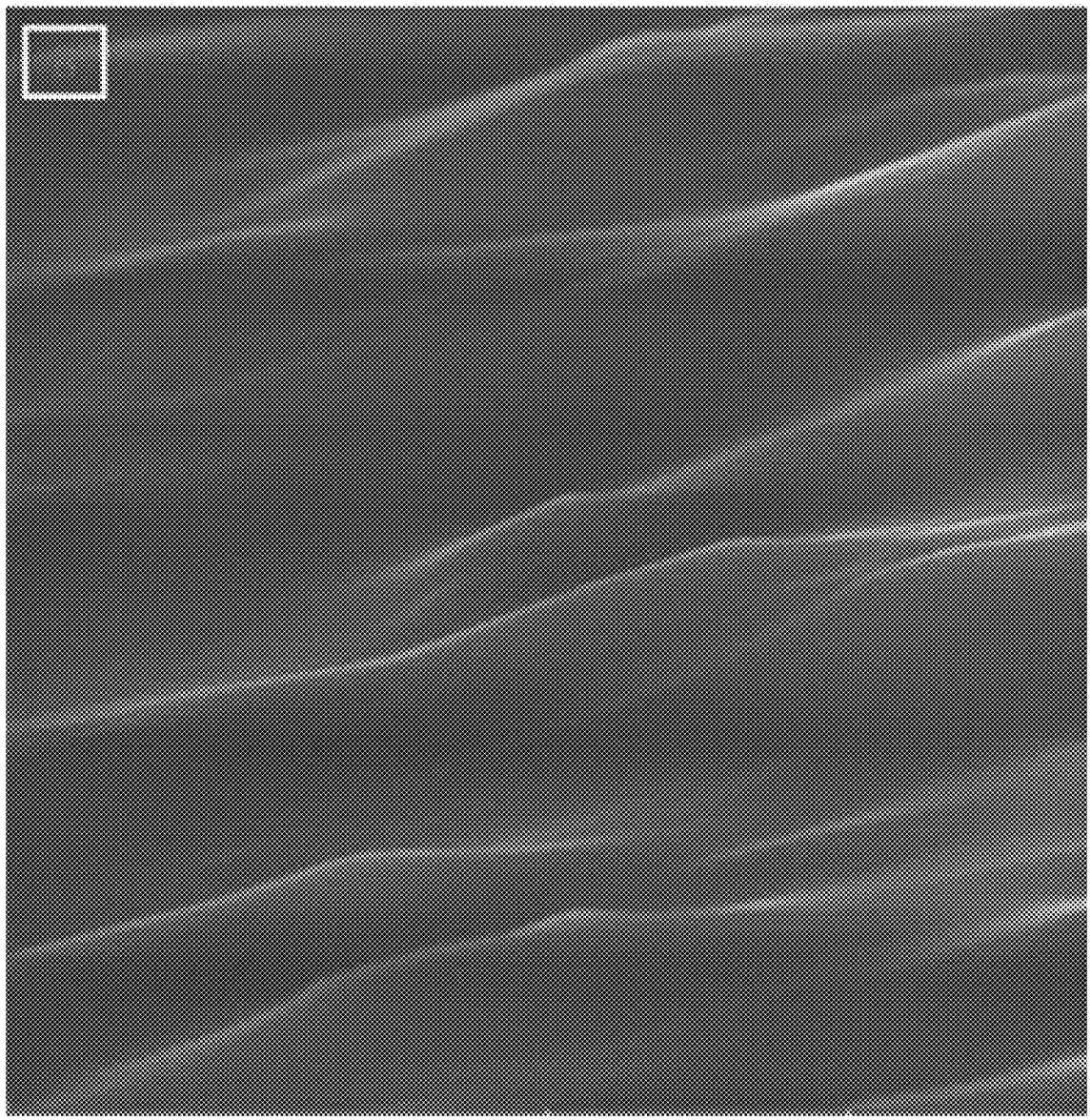
Figure 5C:
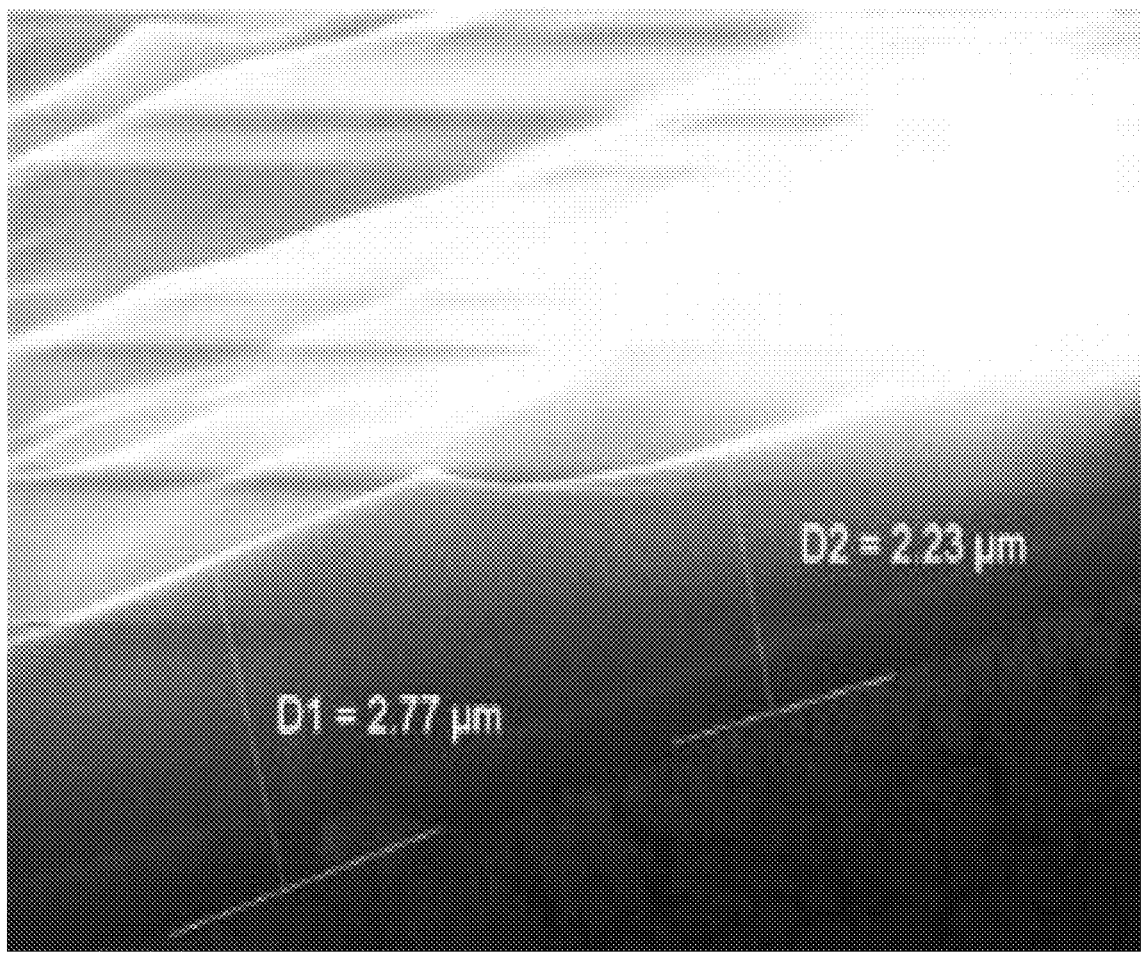

FIG. 5A to 5C illustrate the successful capillary coating operation of BHEA-BPU polymer prepared by sol-gel method observed by scanning electron microscope (SEM) at high resolution. As shown in FIG. 5C, the BHEA-BPU polymer was uniformly deposited/coated inside the fused silica of 320 μm i.d. with estimated 2.5 μm thickness. In addition, the coating morphology reveals no cracks or discontinuity of polymer material within the coated fused silica, and this could offer better accessibility and higher sorption capacity of extractant during micro-extraction operation.

Figure 6:
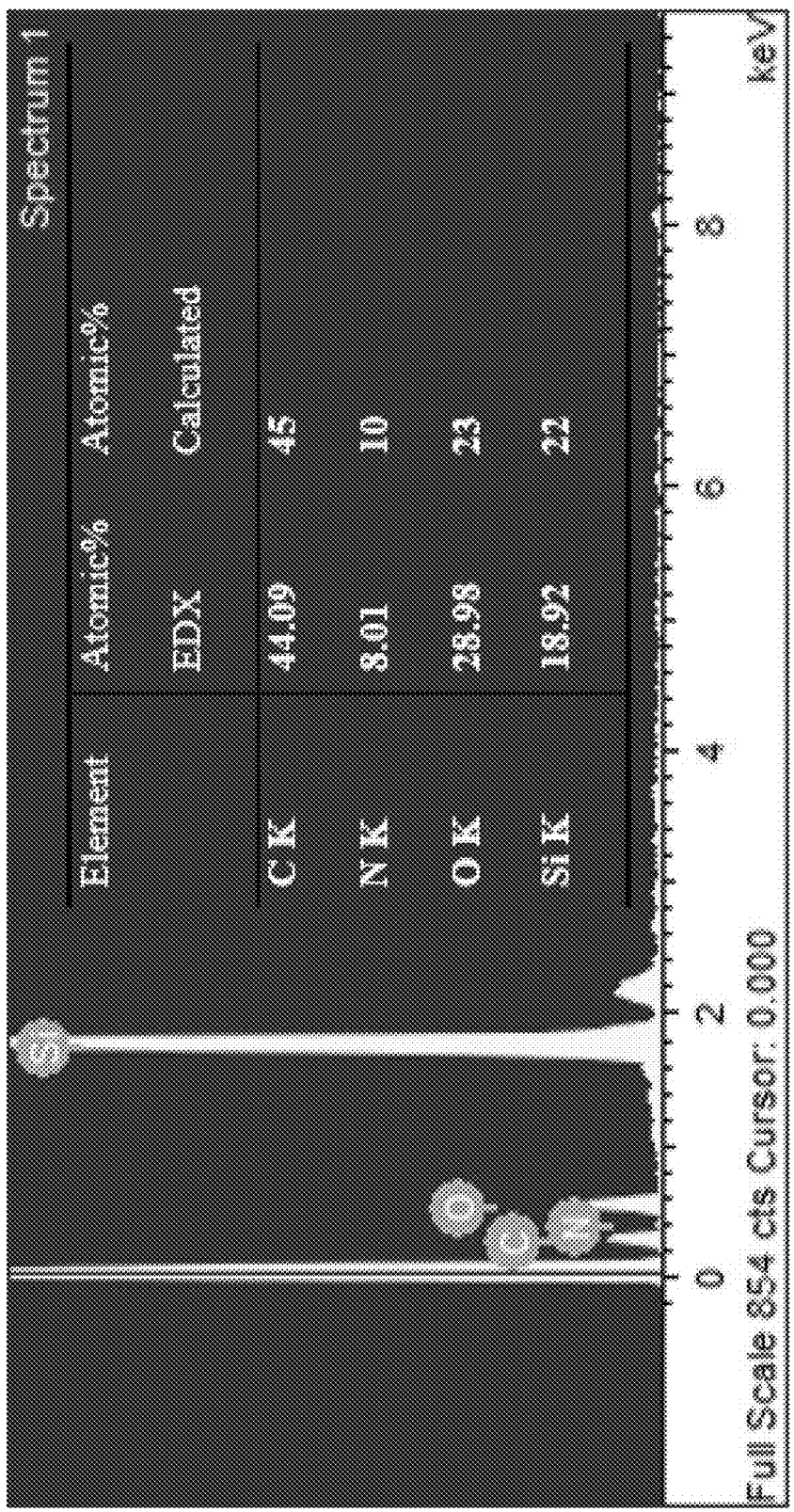
FIG. 6 shows an energy-dispersive X-ray spectroscopy (EDS) analysis of BHEA-BPU polymer coated in fused-silica capillary within the scope of the invention.

Furthermore, the energy dispersive spectroscopy (EDS) shown in FIG. 6, was used to confirm and complement the elemental compositions of the polymer as observed by XPS, and there exist a good correlation between the obtained elemental atomic weight (%) by EDS and the theoretical calculation from the monomers.

FIG. 7 to 14 show exemplary HPLC results for various analytes using the following common conditions. The extraction conditions include: (a) a 40 cm×0.32 mm i.d. sol-gel BPU-BHEA-coated capillary; and (b) extraction time of 30 min. The HPLC column was a 25 cm×4.6 mm i.d. Eclipse XDB C-18 column (5 μm dp). Except for FIG. 12, gradient elution was used from 45:55 (v/v) acetonitrile (ACN): 15 mM (aq.) phosphate buffer 2.5 pH to 70% ACN up to 20 min and 45:55 (v/v) ACN: 15 mM phosphate buffer 2.5 pH from 20 to 30 minutes, with a runtime of 30 min at 0.8 mL/min flow rate, at ambient temperature, using UV detection.

Figure 7:
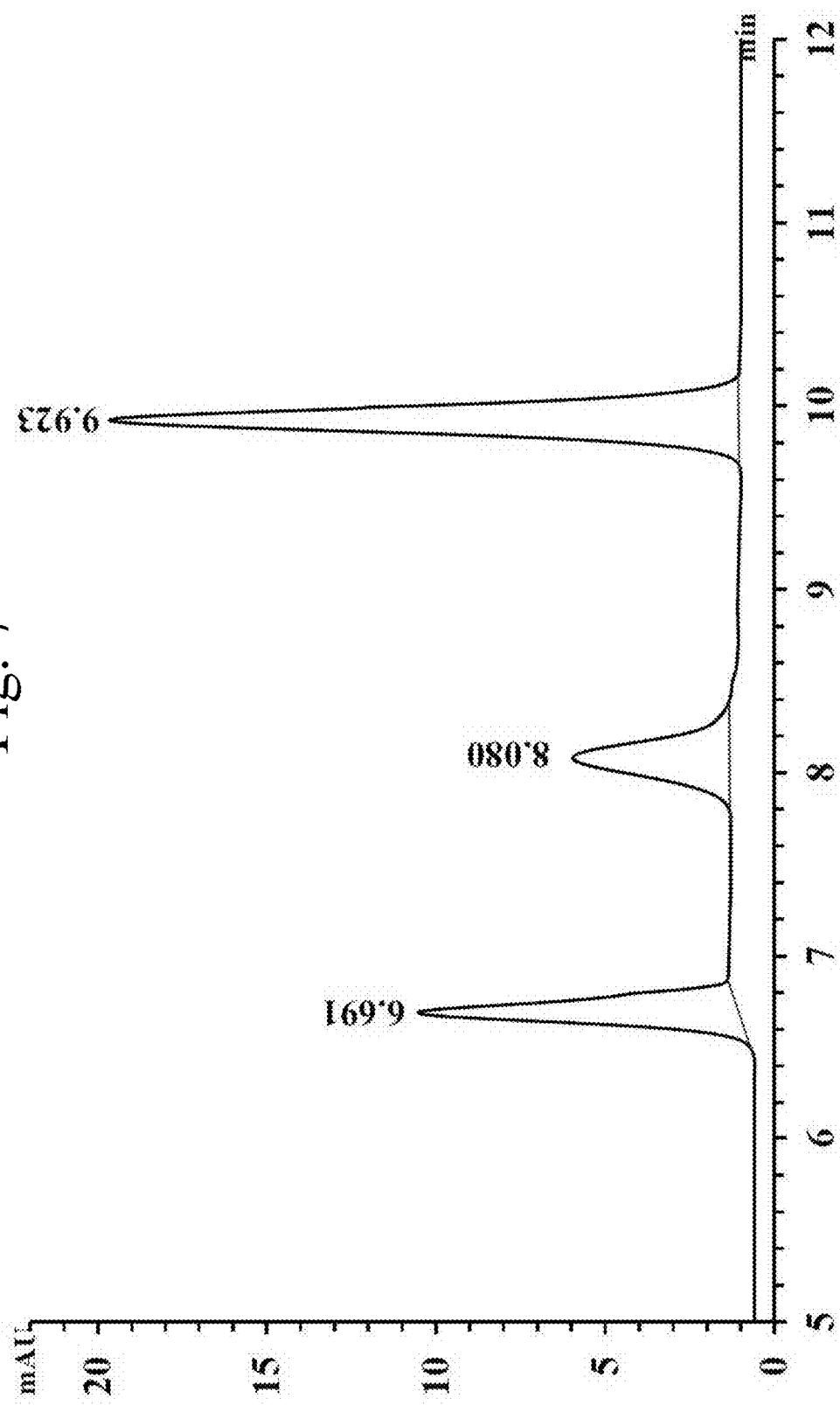
FIG. 7 shows a capillary microextraction-HPLC analysis of amides using a coated capillary within the scope of the invention.

FIG. 7 shows an exemplary capillary microextraction-HPLC analysis of amides using a coated capillary with the scope of the invention, using UV detection at 230 nm. HPLC peaks detected include, each at 50 ng/mL: 4-bromoacetanilide ($t_R$=6.691); n-methyl-1-naphthylacetamide ($t_R$=8.080); and benzanilide ($t_R$=9.923). FIG. 7 shows the online CME-HPLC analysis of three amides, which are considered to be a polar functional group. The BHEA-BPU coating inside the fused silica has amine functional groups that have shown unexpectedly superior effects as an extracting tool for amides.

Figure 8:
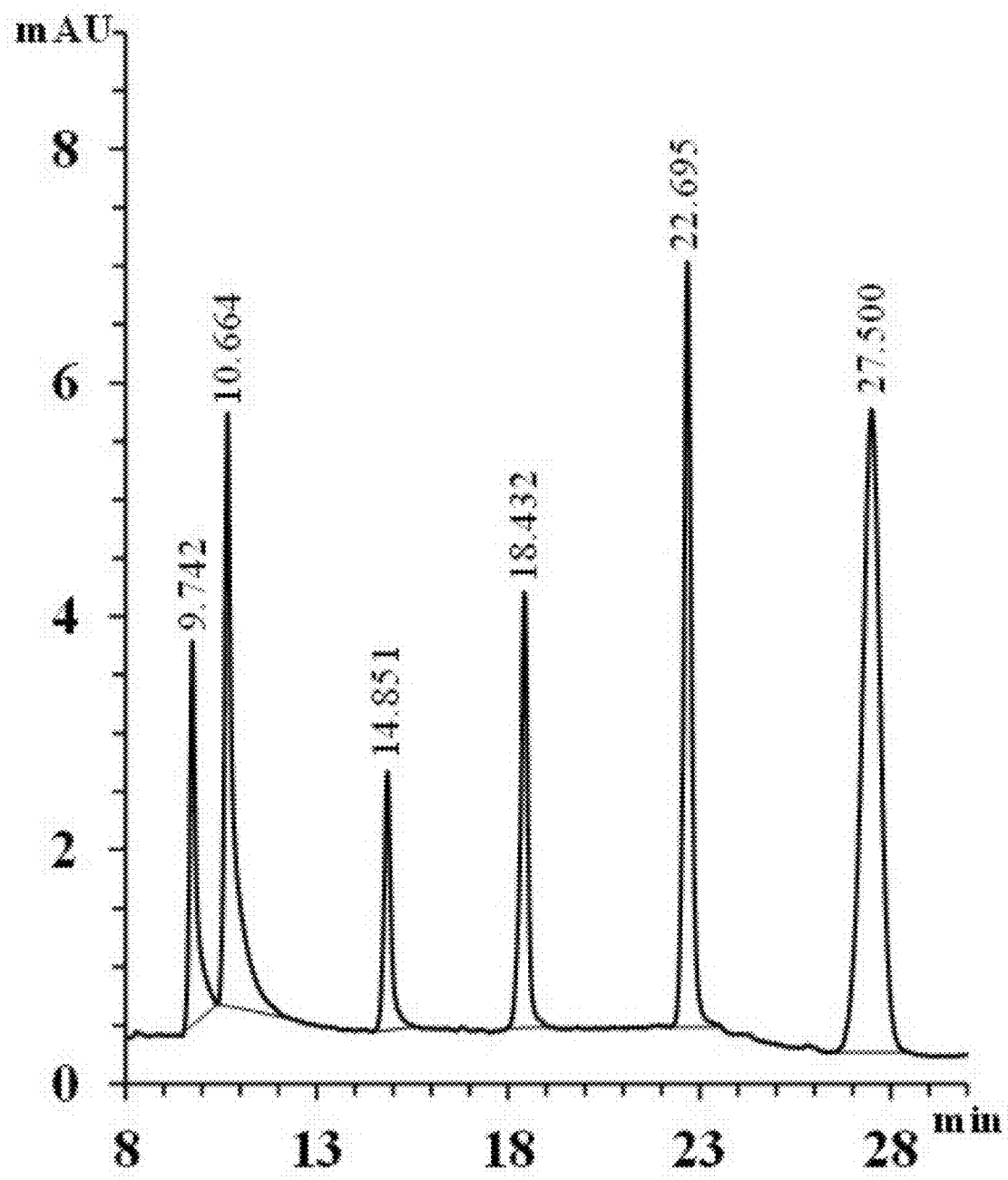
FIG. 8 shows a capillary microextraction-HPLC analysis of phenols using a coated capillary within the scope of the invention.

FIG. 8 shows an exemplary capillary microextraction-HPLC analysis of phenols using a coated capillary with the scope of the invention, using UV detection at 280 nm. HPLC peaks detected include: 2,3-dichlorophenol at 50 ng/mL ($t_R$=9.742); 2,4-dichlorophenol at 50 ng/mL ($t_R$=10.664); 2,4,6-trichlorophenol at 25 ng/mL ($t_R$=14.581); 2-benzyl-4-chlorophenol at 10 ng/mL ($t_R$=18.432); pentachlorophenol at 25 ng/mL ($t_R$=22.695); and 4-tert-octylphenol at 25 ng/mL ($t_R$=27.500). FIG. 8 illustrates the CME-HPLC analysis of highly polar phenols using an inventive BHEA-BPU coated fused silica capillary. For the extraction experiment, mostly chlorinated phenols were selected to enhance the polarity of phenols and prove the extraction capability of the BHEA-BPU coated capillary. FIG. 8 shows that all 6 phenols in a run with concentration ranges from 10 ng/mL to 50 ng/mL was successfully separated. The inventive BHEA-BPU sol-gel coated capillary showed an extraordinary relative standard deviation (% RSD) of less than 6.0 (n=3) with detection limits ranging between 1.92 ng/mL to 12.50 ng/mL (S/N=3) as shown in Table 2. These low detection limits and efficient extraction of polar moieties may be explained by the polar groups (amine in BHEA and urea in BPU) in the BHEA-BPU sol-gel coated capillary.

Figure 9:
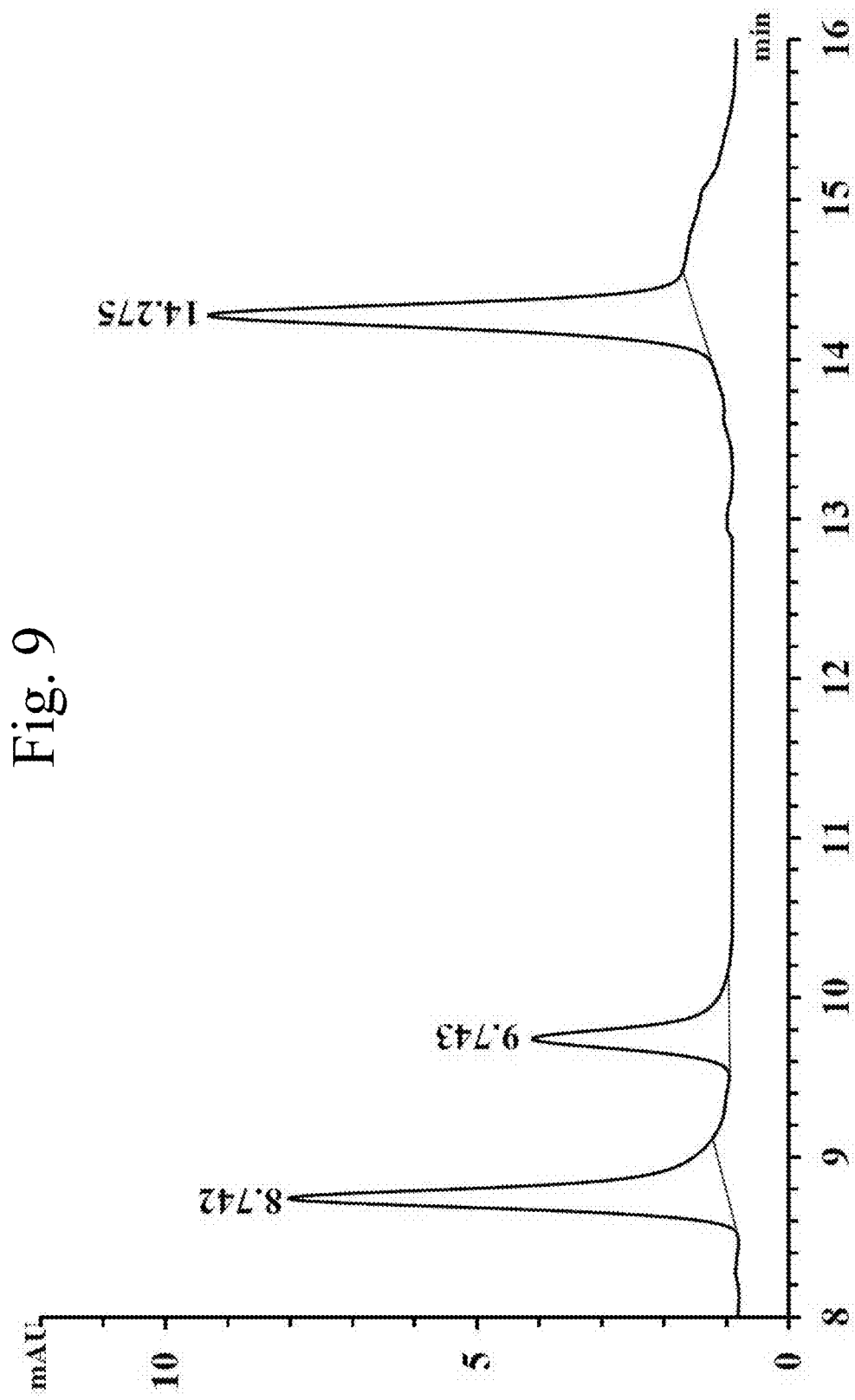
FIG. 9 shows a capillary microextraction-HPLC analysis of alcohols using a coated capillary within the scope of the invention.

FIG. 9 shows an exemplary capillary microextraction-HPLC analysis of alcohols using a coated capillary with the scope of the invention, using UV detection at 230 nm. HPLC peaks detected include, each at 10 ng/mL: 2-naphthol ($t_R$=8.742); 1-naphthol ($t_R$=9.743); and diphenylcarbinol ($t_R$=14.275). FIG. 9 shows the online CME-HPLC analysis for alcohols, considered less polar than phenols but still having polarities on the higher side of organic functional groups. The extraction process was substantially enhanced as compared to phenols, possibly because the selected alcohols have multiple benzene rings that may make them suitable for enhanced interaction with the capillary coating. Since the BHEA-BPU capillary coating is designed to have both polar and non-polar groups, the benzene rings were attracted towards non-polar groups like polydimethylsiloxane in BHEA polymer, and the alcohol interacted with amine functionalities in the coating. These interactions resulted in lower detection limits between 1.39 to 2.38 ng/mL (S/N=3) and % RSD as less than 5 (n=3).

Figure 10:
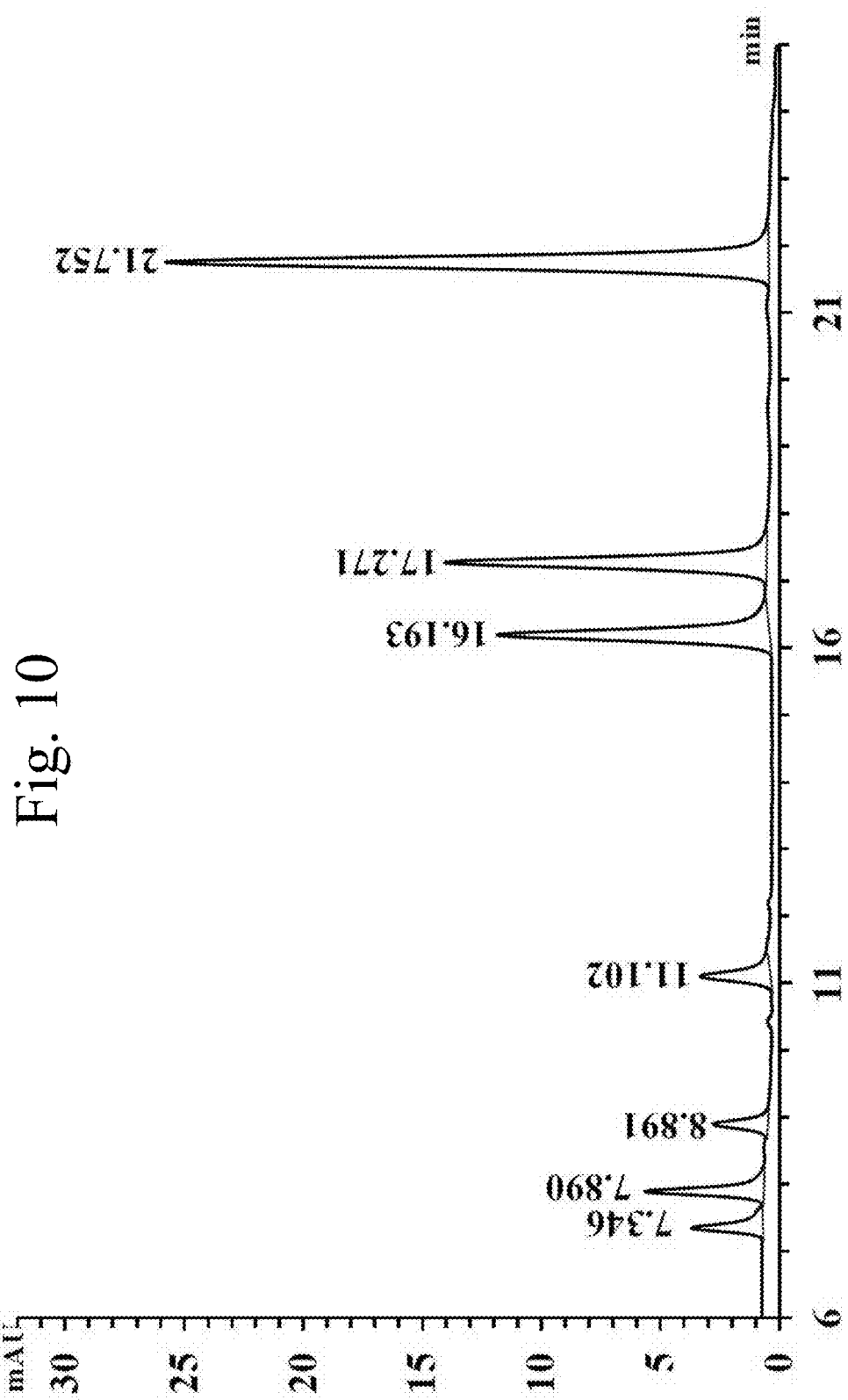
FIG. 10 shows a capillary microextraction-HPLC analysis of ketones using a coated capillary within the scope of the invention.

FIG. 10 shows an exemplary capillary microextraction-HPLC analysis of ketones using a coated capillary with the scope of the invention, using UV detection at 254 nm. HPLC peaks detected include, each at 50 ng/mL: 4-methoxyacetophenone ($t_R$=7.346); 4-hydroxybenzophenone ($t_R$=7.890); 2-hydroxy-2-phenylacetophenone ($t_R$=8.891); propiophenone ($t_R$=11.102); benzophenone ($t_R$=16.193); benzil ($t_R$=17.271); and 4-chlorobenzophenone ($t_R$=21.752). FIG. 10 illustrates the online CME-HPLC analysis of moderately polar ketones. For this purpose, seven members of this class were selected including, 4-methoxyacetophenone, 4-hydroxybenzophenone, 2-hydroxy-2-phenylacetophenone, propiophenone, benzophenone, benzil. The sol-gel BHEA-BPU coated capillary showed excellent extraction efficiencies towards moderately polar analytes with limit of detections 1.70 ng/mL to 13.66 ng/mL and the reproducibility of the extraction process was within 7% (n=3) as shown in Table 2. Similar extraction interactions were shown for aldehydes, likely due to similar/comparable polarities of aldehydes and ketones.

Figure 11:
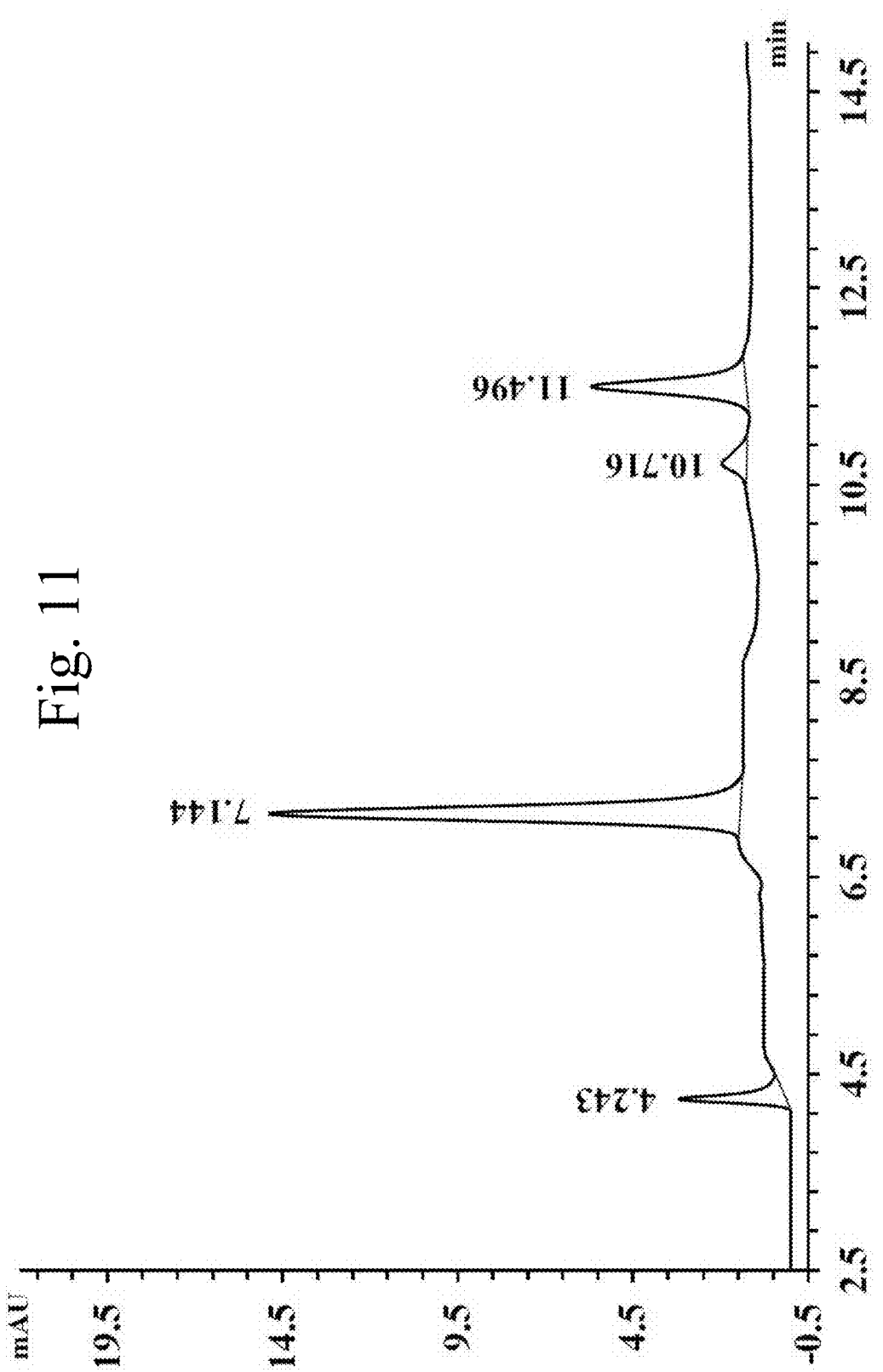
FIG. 11 shows a capillary microextraction-HPLC analysis of aldehydes using a coated capillary within the scope of the invention.

FIG. 11 shows an exemplary capillary microextraction-HPLC analysis of aldehydes using a coated capillary with the scope of the invention, using UV detection at 230 nm. HPLC peaks detected include, each at 50 ng/mL: 4-hydroxy-3-methoxybenzaldehyde ($t_R$=4.243); 5-nitrososalisaldehyde ($t_R$=7.144); 4-chlorobenzaldehyde ($t_R$=10.716); and 5-bromobenzaldehyde ($t_R$=11.496). FIG. 11 shows the CME-HPLC analysis of four selected aldehydes at lower concentrations. The analysis was very efficient for all the compounds, presenting % RSD less than 12% (n=3) and limits of detection (LOD) ranging between 5.40 ng/mL to 14.29 ng/mL (S/N=3).

Figure 12:
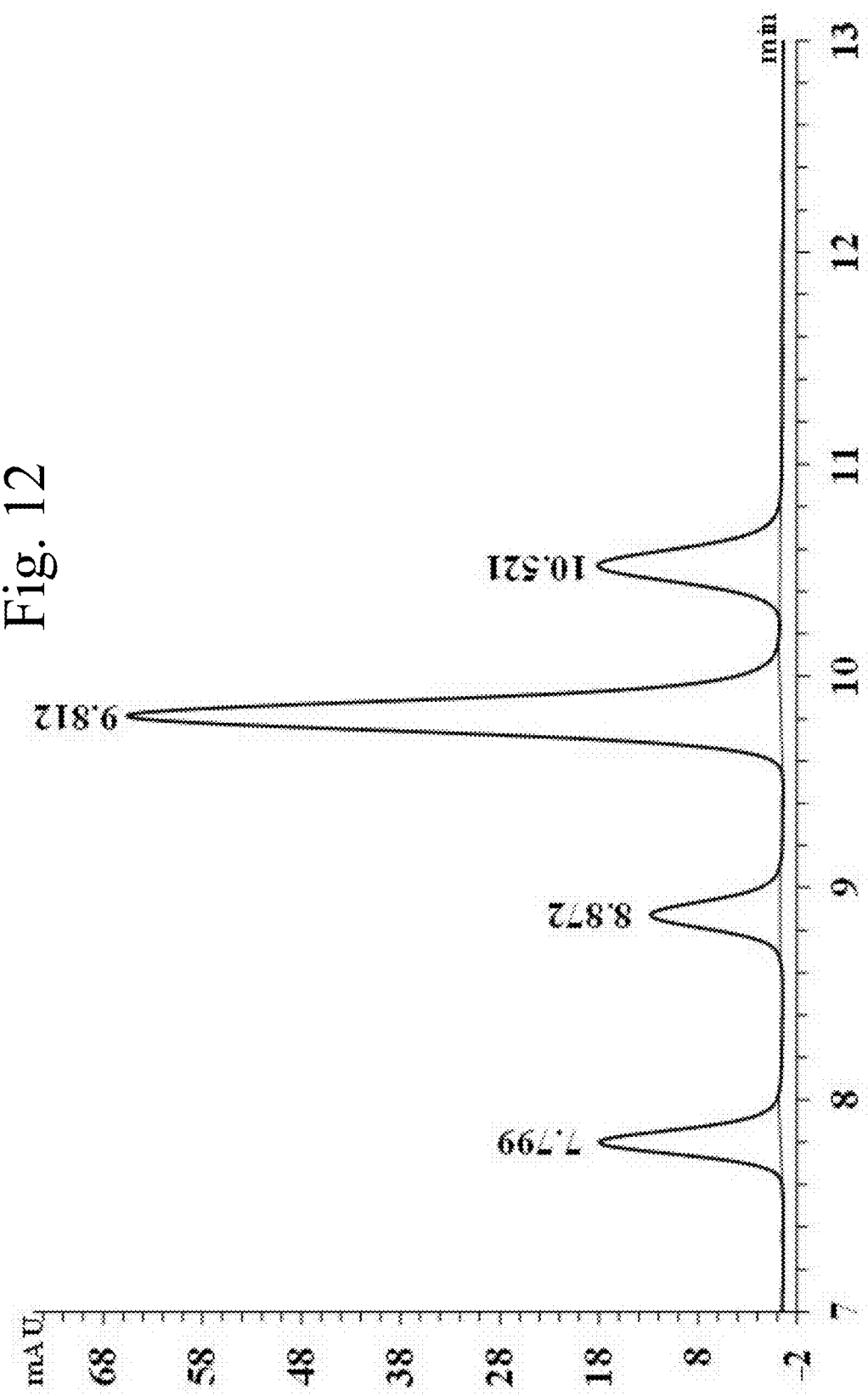
FIG. 12 shows a capillary microextraction-HPLC analysis of aldehydes using a coated capillary within the scope of the invention.

FIG. 12 shows an exemplary capillary microextraction-HPLC analysis of polyaromatic hydrocarbons using a coated capillary with the scope of the invention, using UV detection at 254 nm. Unlike the standard elution conditions, this run used isocratic elution with 80:20 (v/v) CAN:water for 15 minutes. HPLC peaks detected include, each at 1 ng/mL: biphenyl ($t_R$=7.799); fluorene ($t_R$=8.872); phenanthrene ($t_R$=9.812); and acenaphthene ($t_R$=10.521). The online CME-HPLC analysis of polyaromatic hydrocarbons as a non-polar representative class using sol-gel BHEA-BPU coated capillary is shown in FIG. 12. For the extraction procedure, four members of this class were selected including biphenyl, fluorene, phenanthrene, and anthracene. The efficient extraction of these compounds may be explained due to the PDMS moiety in the BHEA polymer. Moreover, the significant extraction took the LODs to lower-level ranging between 0.10 ng/mL to 0.40 ng/mL (S/N=3) with extraordinary % RSD less than 4.5 (n=3) as shown in Table 2.

Figure 13:
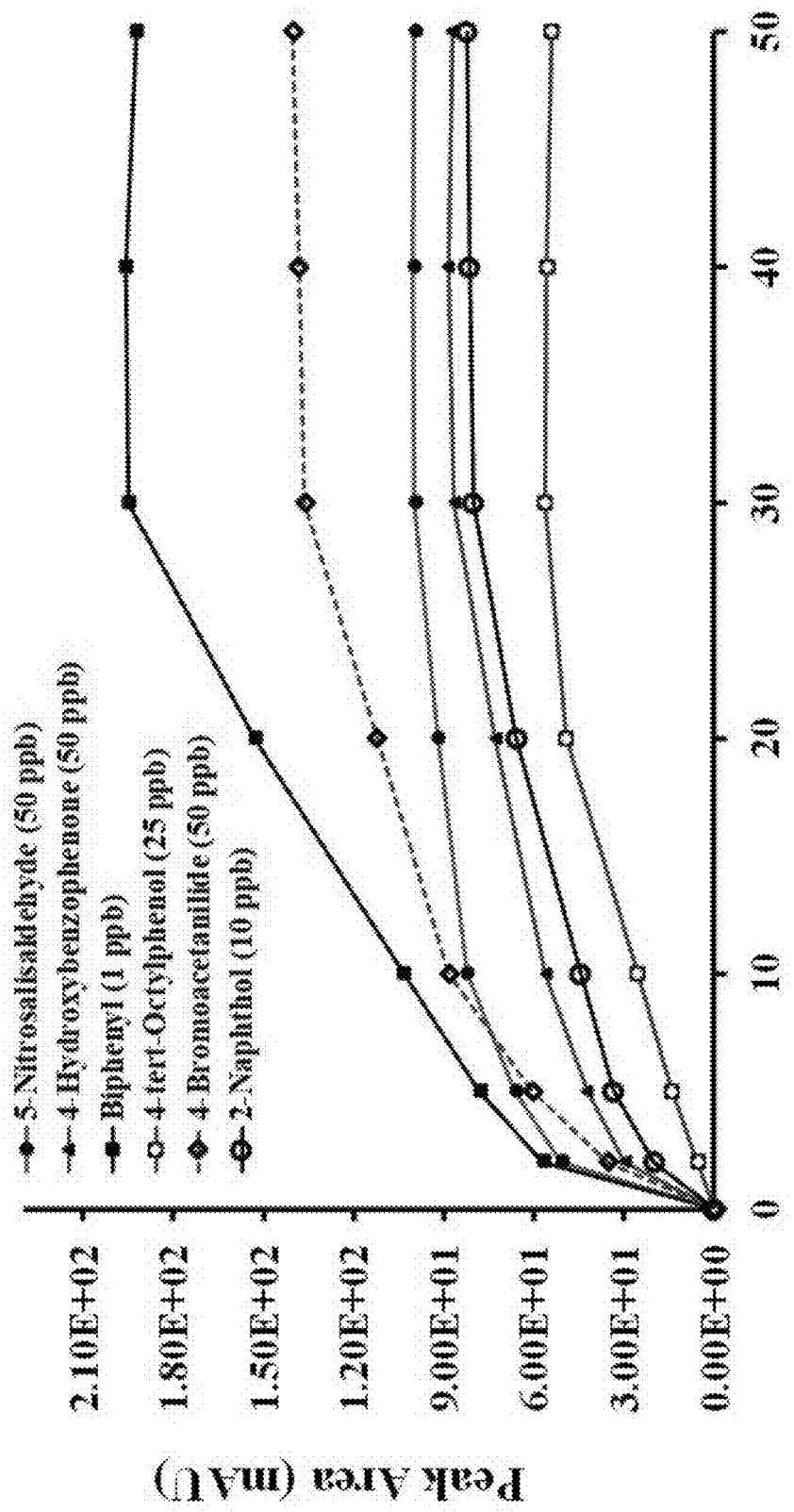
FIG. 13 shows a plot of extraction kinetics for selected analytes using a coated capillary within the scope of the invention.

FIG. 13 shows the extraction kinetic profile of the selected classes of analytes in online CME-HPLC analysis using the inventive BHEA-BPU coated capillary. FIG. 13 shows a plot of extraction kinetics of 4-bromoacetanilide at 50 ng/mL, 4-tert-octylphenol at 25 ng/mL, 2-naphthol at 10 ng/mL, 4-hydroxybenzophenone at 50 ng/mL, 5-nitrosalisaldehyde at 50 ng/mL, and biphenyl at 1 ng/mL, each as a representative a compound class of amides, phenols, alcohols, ketones, aldehydes, and PAH. One member of each compound class was selected, including 4-bromoacetanilide (amide, polar) 4-tert-octylphenol (phenol, polar), 2-naphthol (alcohol, polar) 4-hydroxybenzophenone (ketone, moderately polar), 5-nitrosalisaldehyde (aldehyde, moderately polar), and biphenyl (polyaromatic hydrocarbon, non-polar). A series of experiments were conducted for the extraction of these analytes from the water samples. The selected concentration for the extraction kinetic profile was based on the detection limits of the respective compound. The time for the extraction process was varied from 2 to 50 minutes (2, 5, 10, 20, 30, 40, and 50 minutes) to evaluate the extraction kinetics. The average peak was plotted against the extraction time. All four analytes, a representative of each compound class, showed maximum peak area at 30 minutes, indicating that the sol-gel coated BHEA-BPU coated capillary achieve equilibrium after 30 minutes. However, the profile suggests the good extraction of non-polar analytes PAHs and significant extraction for moderately polar (ketones and aldehydes) and highly polar analytes (phenols).

Figure 14:
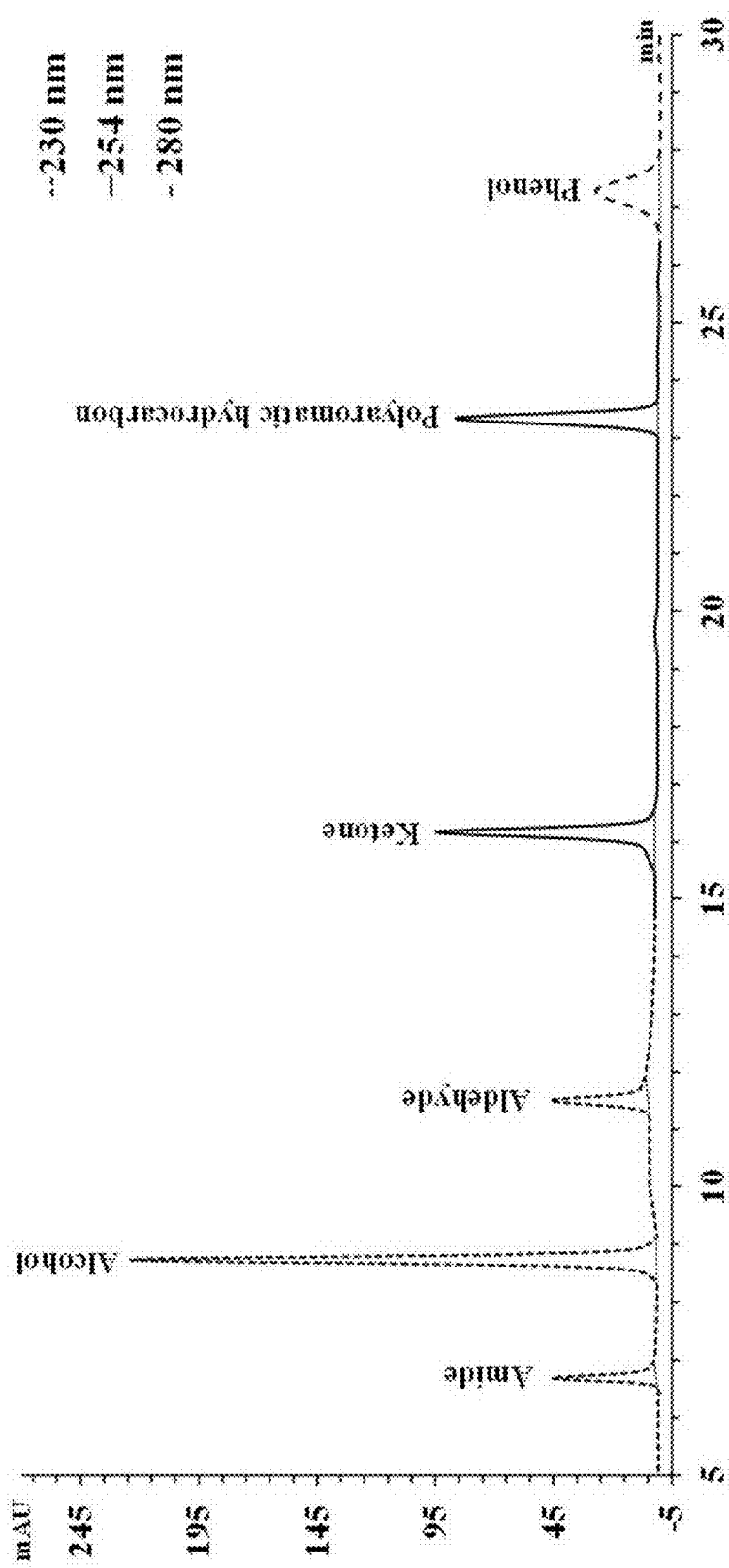
FIG. 14 shows a chromatogram of a single run designed for determining the capillary to capillary % relative standard deviation (RSD) for different classes of compounds of varying polarity.

FIG. 14 shows a chromatogram of a single run designed for determining the capillary to capillary % RSD for different classes of compounds of varying polarity, using UV detection with a photodiode array detector at 230 nm (amides, alcohols, and aldehydes), 254 nm (ketones, polyaromatic hydrocarbons), and 280 nm (phenols). To evaluate the capillary to capillary reproducibility, a special run was designed where compounds from all the classes from varied polarities loaded on the same chromatographic run in FIG. 14. A photodiode array detector was used for this purpose, and all three desired wavelengths were simultaneously irradiated: for amides, alcohols, and aldehydes, 230 nm; for ketones and PAHs, 254 nm; and for phenols, 280 nm. In the experiment, three BHEA-BPU coated capillaries were cut of same size (40 cm) and used for extraction. The extraction time was kept constant (30 minutes), and a mixture of 6 compounds containing all 6 class of compounds were analyzed. In this analysis, amides, alcohols, aldehydes, ketones, PAHs, and phenols showed 2.7, 5.7, 9.9, 6.3, 4.9 and 1.7% RSD (n=3) as shown in Table 3.

TABLE 3

Reproducibility for capillary to capillary extraction, one member from each class was selected based on well resolved peaks and retention time.

| | | | Peak area reproducibility | | | |
|---|---|---|---|---|---|---|
| Chemical class | Name | R.T. | Mean peak area (n = 3) Capillary 1 | Mean peak area (n = 3) Capillary 2 | Mean peak area (n = 3) Capillary 3 | Capillary to Capillary % RSD |
| Amides | 4-bromoacetanilide | 6.718 | 433.0 | 453.0 | 431.5 | 2.7 |
| Alcohols | 2-naphthol | 8.821 | 2875.0 | 2688.0 | 2566.2 | 5.7 |
| Aldehyde | 5-bromobenzaldehyde | 11.616 | 401.0 | 461.8 | 488.2 | 9.9 |
| Ketone | Benzophenone | 16.075 | 1288.0 | 1457.7 | 1344.0 | 6.3 |
| PAHs | Biphenyl | 23.656 | 1110.0 | 1014.8 | 1027.0 | 4.9 |
| Phenols | 4-tertoctylphenol | 27.752 | 858.0 | 857.7 | 883.0 | 1.7 |

Figure 15:
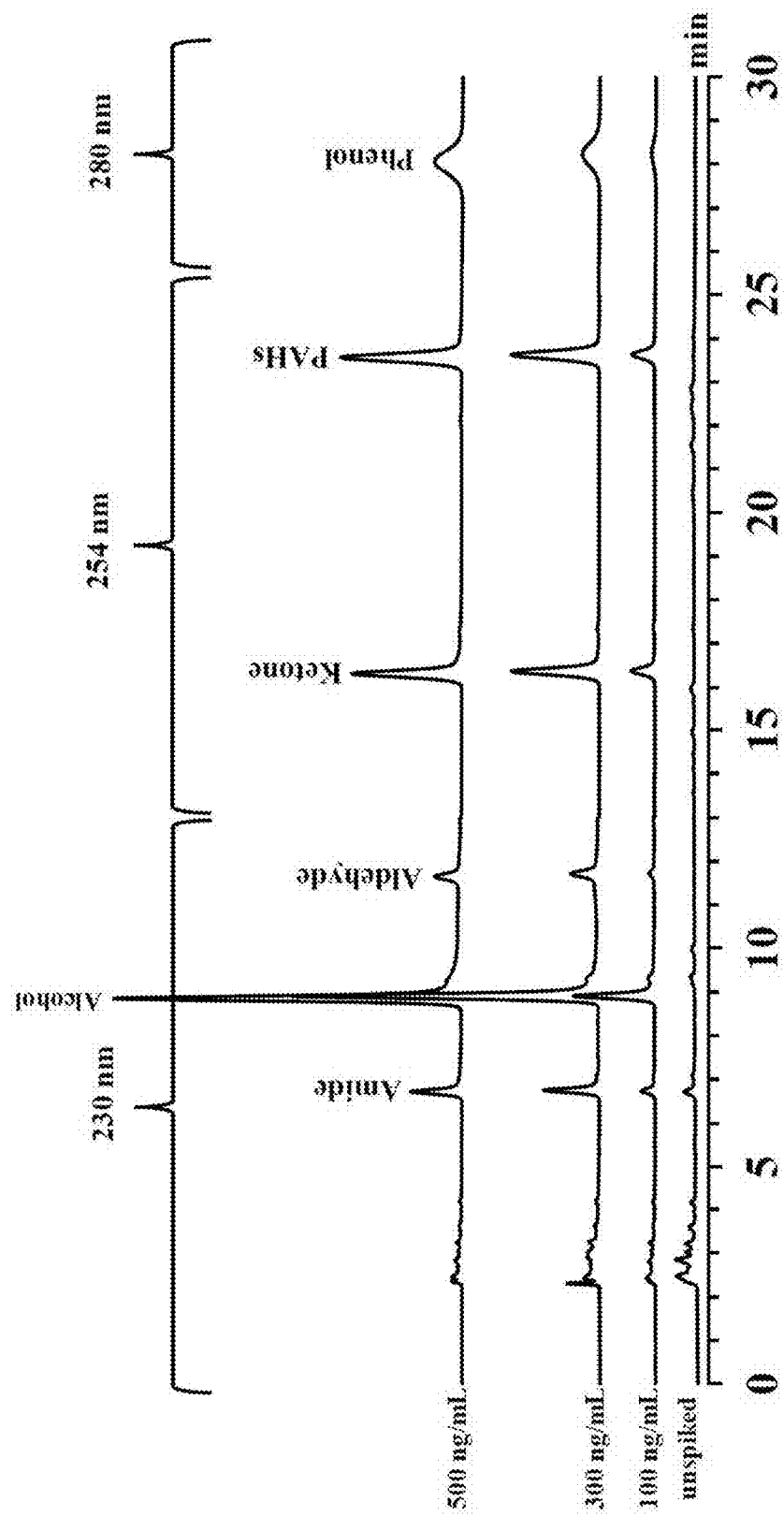
FIG. 15 shows a wastewater chromatographic analysis using a BHEA-BPU coated capillary within the scope of the invention.
Figure 16:
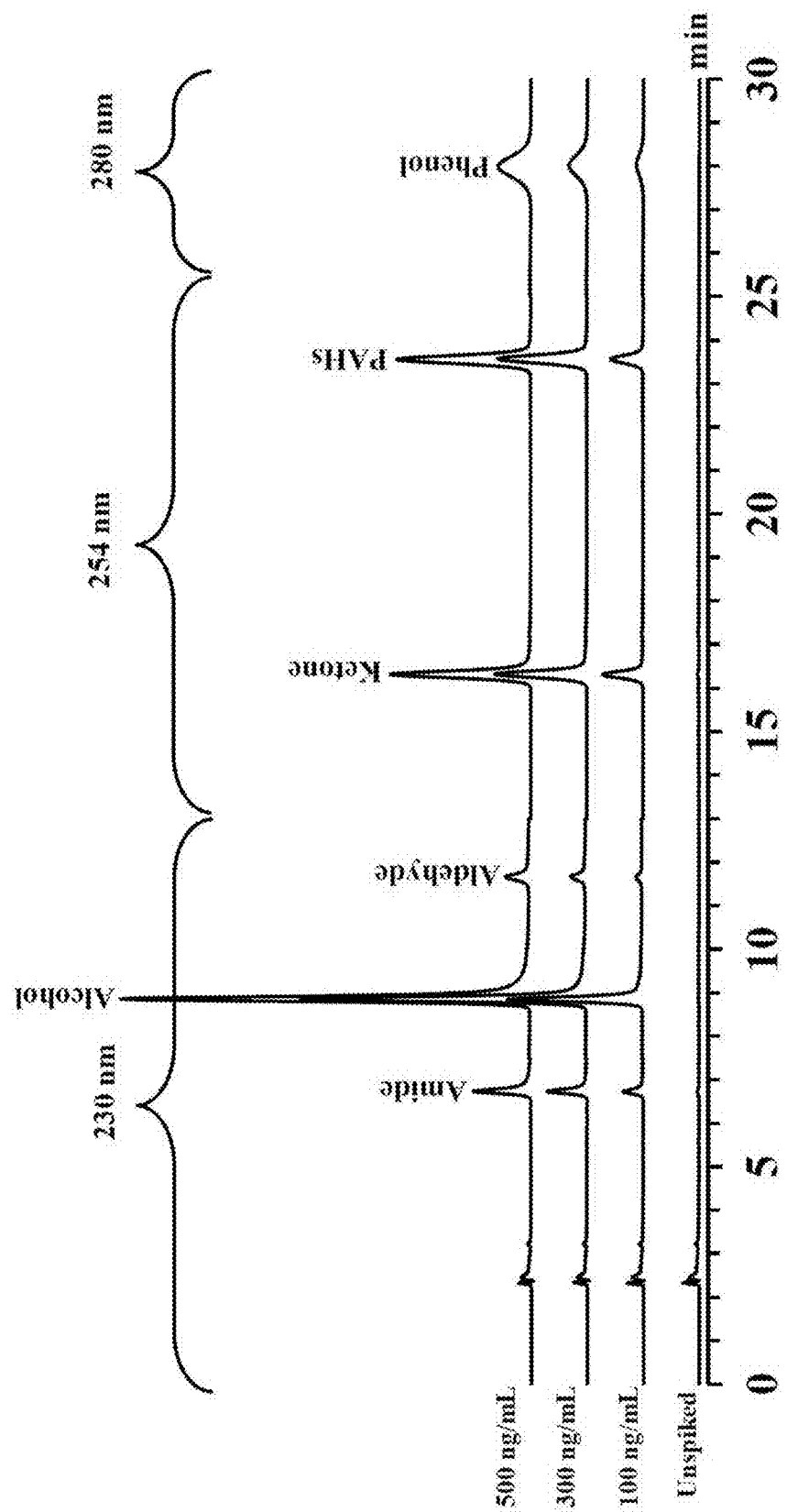
FIG. 16 shows a seawater chromatographic analysis using a BHEA-BPU coated capillary within the scope of the invention.
Figure 17:
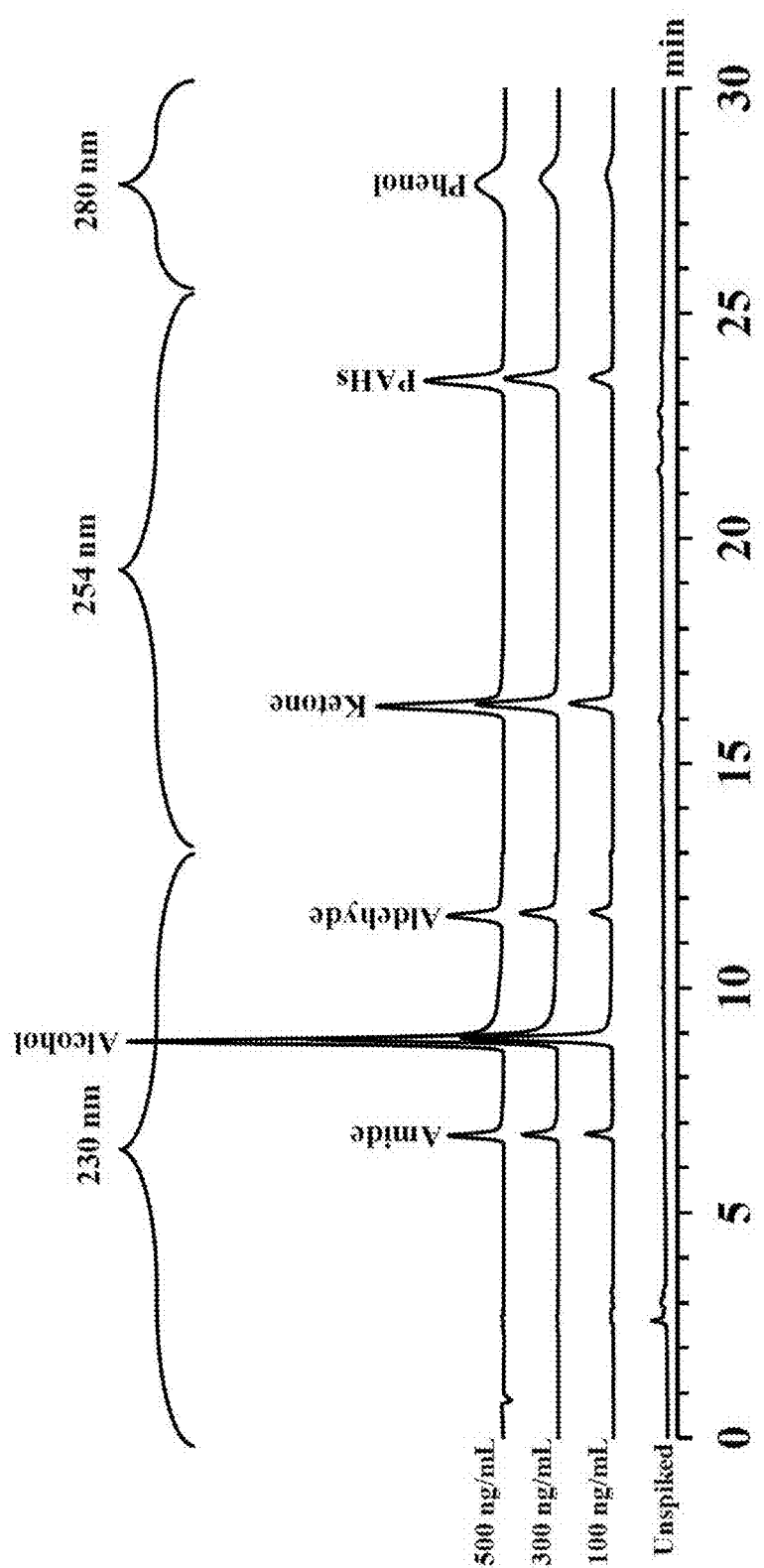
FIG. 17 shows a pool water chromatographic analysis using a BHEA-BPU coated capillary within the scope of the invention.

FIG. 15 to 17 show a chromatographic analysis of wastewater (FIG. 15), seawater (FIG. 16), and pool water (FIG. 17), using a BHEA-BPU coated capillary with the scope of the invention: unspiked; 100 ng/mL spiked; 300 ng/mL spiked; and 500 ng/mL spiked wastewater, using UV detection with a photodiode array detector at 230 nm (amides, alcohols, and aldehydes), 254 nm (ketones, polyaromatic hydrocarbons), and 280 nm (phenols), under the HPLC conditions discussed above. The online CME-HPLC analysis of selected analytes indicates the applicability of the BHEA-BPU coated capillary in wastewater, seawater, and pool water. Wastewater showed acceptable recovery, between 87.5 and 112.8%, with RSD less than 8.7% (n=3). The data for seawater and pool water indicated adequate recovery and RSD as shown in Table 4, below. The chromatographs can be seen FIG. 15 to 17, respectively, for wastewater, seawater, and pool water. The overall recovery range for any type of selected water and at any concentration level ranged from 87.5 to 114.8% with RSD less than 11.0%.

TABLE 4

Analytical results of wastewater, sea-water and pool-water samples

| Class: Analyte | Spiked Conc. (ng/mL) | Wastewater Recovery (%) | RSD (%) | Sea-water Recovery (%) | RSD (%) | Pool-water Recovery (%) | RSD (%) |
|---|---|---|---|---|---|---|---|
| Amides: 4-bromoacetanilide | 100 | 105.3 | 8.4 | 113.8 | 9.5 | 107.6 | 10.8 |
|  | 300 | 112.8 | 6.3 | 108.5 | 6.2 | 108.6 | 6.4 |
|  | 500 | 103.1 | 6.2 | 114.8 | 7.4 | 112.9 | 7.5 |
| Alcohols: 2-naphthol | 100 | 104.8 | 8.4 | 105.2 | 8.8 | 108.6 | 10.9 |
|  | 300 | 108.7 | 6.0 | 88.8 | 5.1 | 114.8 | 6.8 |
|  | 500 | 97.6 | 5.9 | 114.2 | 7.4 | 113.5 | 7.6 |
| Aldehydes: 5-bromobenzaldehyde | 100 | 91.0 | 7.3 | 89.1 | 7.4 | 87.8 | 8.8 |
|  | 300 | 87.8 | 4.9 | 88.2 | 5.0 | 90.7 | 5.3 |
|  | 500 | 87.5 | 5.3 | 102.4 | 6.6 | 95.9 | 6.4 |
| Ketones: Benzophenone | 100 | 108.3 | 8.7 | 110.3 | 9.2 | 104.8 | 10.5 |
|  | 300 | 111.2 | 6.2 | 111.0 | 6.3 | 109.4 | 6.4 |
|  | 500 | 92.0 | 5.6 | 110.7 | 7.1 | 113.0 | 7.5 |
| PAHs: Biphenyl | 100 | 88.8 | 7.1 | 102.1 | 8.5 | 98.5 | 9.8 |
|  | 300 | 88.1 | 4.9 | 92.0 | 5.3 | 95.1 | 5.6 |
|  | 500 | 93.3 | 5.7 | 88.0 | 5.7 | 95.2 | 6.3 |
| Phenols: 4-tertoctylphenol | 100 | 108.0 | 8.6 | 113.4 | 9.5 | 108.2 | 9.7 |
|  | 300 | 106.8 | 5.9 | 110.2 | 6.3 | 109.4 | 6.4 |
|  | 500 | 99.7 | 6.0 | 110.3 | 7.1 | 104.7 | 7.0 |

Numerous modifications and variations of the present invention are possible in light of the above teachings. It is therefore to be understood that within the scope of the appended claims, the invention may be practiced otherwise than as specifically described herein.

REFERENCE SIGNS

1 sample
2a HPLC pump 1 (e.g., isocratic)
2b HPLC pump 2 (e.g., gradient)
3 injector
4 waste
5 column oven/heater
6 detector (e.g., UV-vis, ELS, $n_D$, thermal, etc.)
7 sol-gel coated capillary
8 HPLC system
9 sample flow system
10 manual injection system

The invention claimed is:

1. A glass capillary-, comprising an inner surface and an outer surface,
wherein the inner surface comprises a coating comprising
a sol-gel component HA comprising reacted units of:
a sol-gel precursor having a structure (I)

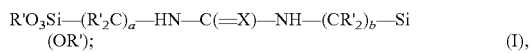

(I), wherein X is O or S, R' is independently H, methyl, ethyl, propyl, s-propyl, butyl, s-butyl, isobutyl, t-butyl, pentyl, s-pentyl, isoamyl, neopentyl, C6-alkyl, phenyl, or pyridyl, and a and b are independently in a range of from 1 to 20; and a sol-gel active polymer having a structure (ii)

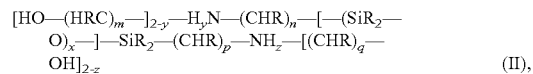

(II), wherein R is independently H, methyl, ethyl, propyl, s-propyl, butyl, s-butyl, isobutyl, t-butyl, pentyl, s-pentyl, isoamyl, neopentyl, C6-alkyl, phenyl, or pyridyl, y and z are independently 0 or 1, x is in a range of from 5 to 2,500, and m, n, p, and q are independently in a range of from 1 to 20,
wherein the coating has a thickness in a range of from 1 to 10 microns, and
wherein the sol-gel component is covalently bonded to the inner surface of the glass capillary.

2. The glass capillary of claim 1, wherein, in the sol-gel precursor, X is O, R' is H, and a and b are in range of from 2 to 10.

3. The glass capillary of claim 2, wherein, in the sol-gel precursor, a and b are identical and in a range of from 2 to 4.

4. The glass capillary of claim 1, wherein, in the sol-gel active polymer, R is H, y and z are 0, x is in a range of from 25 to 500, and m, n, p, and q are independently in range of from 2 to 10.

5. The Mass capillary of claim 3, wherein, in the sol-gel active polymer, R is H, y and z are 0, x is in a range of from 30 to 250, m and q are identical, and m, n, and p are independently in range of from 2 to 4.

6. The glass capillary of claim 4, wherein, in the sol-gel active polymer, m and q are identical to each other, n and p are identical to each other, and m and n are independently in range of from 2 to 5.

7. The glass capillary of claim 1, wherein the sol-gel component comprises termini comprising hydroxyalkyl groups.

8. The glass capillary of claim 1, wherein a sol-gel reagent ratio, based on equivalents of the sol-gel polymer to equivalents of the sol-gel precursor, is in a range of from 1:1 to 1:5.

9. The glass capillary of claim 1, which is formed in a solvent comprising an alcohol in at least 50 wt. % of total solvent weight.

10. The glass capillary of claim 1, wherein at least 90% of the sol-gel precursor comprises bis(trimethoxysilylpropyl) urea, bis(triethoxysilylpropyl) urea, bis(trimethoxysilylethyl) urea, bis(triethoxysilylethyl) urea, bis(trimethoxysilylbutyl) urea, bis(triethoxysilylbutyl) urea, bis(trimethoxysilylmethylpropyl) urea, bis(triethoxysilylmethylpropyl) urea, bis(trimethoxysilylpentyl) urea, bis(triethoxysilylpentyl) urea, bis(trimethoxysilylhexyl) urea, bis(triethoxysilylhexyl) urea, bis(trimethoxysilylcyclohexyl) urea, and/or bis(triethoxysilylcyclohexyl) urea, and wherein at least 90% of the sol-gel active polymer comprises $[HO-(H_2C)_2]_2-N-(CH_2)_2-[-(Si(CH_3)_2-O)_{30-50}]-Si(CH_3)_2-(CH_2)_2-N[(CH_2)_2OH]_2$,
$[HO-(H_2C)_3]_2-N-(CH_2)_2-[-(Si(CH_3)_2-O)_{30-50}]-Si(CH_3)_2-(CH_2)_2-N[(CH_2)_3OH]_2$,
$[HO-(H_2C)_2]_2-N-(CH_2)_3-[-(Si(CH_3)_2-O)_{30-50}]-Si(CH_3)_2-(CH_2)_3-N[(CH_2)_2OH]_2$,
$[HO-(H_2C)_3]_2-N-(CH_2)_3-[-(Si(CH_3)_2-O)_{30-50}]-Si(CH_3)_2-(CH_2)_3-N[(CH_2)_3OH]_2$,
$[HO-(H_2C)_2]_2-N-(CH_2)_4-[-(Si(CH_3)_2-O)_{30-50}]-Si(CH_3)_2-(CH_2)_2-N[(CH_2)_2OH]_2$,
$[HO-(H_2C)_4]_2-N-(CH_2)_2-[-(Si(CH_3)_2-O)_{30-50}]-Si(CH_3)_2-(CH_2)_2-N[(CH_2)_4OH]_2$,
$[HO-(H_2C)_3]_2-N-(CH_2)_4-[-(Si(CH_3)_2-O)_{30-50}]-Si(CH_3)_2-(CH_2)_4-N[(CH_2)_3OH]_2$,
$[HO-(H_2C)_4]_2-N-(CH_2)-[-(Si(CH_3)_2-O)_{30-50}]-Si(CH_2)_2-(CH_2)_3-N[(CH_2)_4OH]_2$, and/or
$[HO-(H_2C)_4]_2-N-(CH_2)_4-[-(Si(CH_3)_2-O)_{30-50}]-Si(CH_3)_2-(CH_2)_4-N[(CH_2)_4OH]_2$.

11. The glass capillary of claim 1, wherein the coating is formed by reacting bis(trimethoxysilylpropyl)urea (BPU) and [bis(hydroxyethyl)amine] (BHEA)-terminated polydimethylsiloxane.

12. The glass capillary of claim 7, comprising
a glass surface comprising silanol moieties; and
the sol-gel component,
wherein terminal hydroxyl groups of the sol-gel are condensed with the silanol moieties of the glass surface to form a covalent bond.

13. The glass capillary of claim 1, which is a fused silica micro-extraction capillary.

14. The glass capillary of claim 13, wherein the fused silica micro-extraction capillary comprises a Type I fused silica.

15. A micro extraction method, comprising:
(a) introducing an aqueous sample into the glass capillary of claim 1; and optionally
(b) passing an eluant comprising acetonitrile and/or deionized water through the glass capillary.

16. A method for analyzing a sample, the method comprising:
(a) introducing a dissolved sample into the glass capillary of claim 1;
(b) passing an eluant through the glass capillary;
(c) desorbing an extracted analyte from the glass capillary onto an analytical column; and
(d) eluting the analytical column.

17. A method of enhancing analytical sensitivity, the method comprising:
combining the glass capillary of claim 1 in series with an HPLC or GC column.

* * * * *